United States Patent
Idehara

(10) Patent No.: US 10,530,964 B2
(45) Date of Patent: Jan. 7, 2020

(54) IMAGE FORMING APPARATUS DETERMINING COINCIDING IMAGE DATA BANDS

(71) Applicant: KONICA MINOLTA, INC., Chiyoda-ku, Tokyo (JP)

(72) Inventor: Takenori Idehara, Sagamihara (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/905,931

(22) Filed: Feb. 27, 2018

(65) Prior Publication Data

US 2018/0262647 A1    Sep. 13, 2018

(30) Foreign Application Priority Data

Mar. 9, 2017   (JP) ................. 2017-045397

(51) Int. Cl.
| | |
|---|---|
| *G06K 15/00* | (2006.01) |
| *H04N 1/415* | (2006.01) |
| *H04N 1/00* | (2006.01) |
| *H04N 1/411* | (2006.01) |
| *G06K 15/02* | (2006.01) |

(Continued)

(52) U.S. Cl.
CPC ............. *H04N 1/415* (2013.01); *G06K 15/18* (2013.01); *G06K 15/1817* (2013.01); *G06K 15/1861* (2013.01); *H04N 1/00374* (2013.01); *H04N 1/00801* (2013.01); *H04N 1/00832* (2013.01); *H04N 1/41* (2013.01); *H04N 1/4115* (2013.01);

(Continued)

(58) Field of Classification Search
None
See application file for complete search history.

(56) References Cited

U.S. PATENT DOCUMENTS

| | | | | |
|---|---|---|---|---|
| 2007/0240139 A1* | 10/2007 | Osada | ............. | G06K 15/02 |
| | | | | 717/146 |
| 2013/0077868 A1* | 3/2013 | Ito | ............. | G06T 1/60 |
| | | | | 382/195 |
| 2016/0253129 A1* | 9/2016 | Achiwa | ............. | G06K 15/1857 |
| | | | | 358/1.18 |

FOREIGN PATENT DOCUMENTS

| | | |
|---|---|---|
| CN | 101388946 A | 3/2009 |
| CN | 103177111 A | 6/2013 |

(Continued)

OTHER PUBLICATIONS

First Office Action issued in corresponding Chinese Patent Application No. 201810174486.9, dated May 27, 2019 (18 pages).

*Primary Examiner* — Henok Shiferaw

(74) *Attorney, Agent, or Firm* — Buchanan Ingersoll & Rooney PC

(57) ABSTRACT

An image forming apparatus includes: a hardware processor that: generates image data for composition; and divides the image data for composition into bands; an output memory; a storage that determines whether image data of each band coincides with image data of another band, secures a unique region, transfers the image data of the band to the unique region and associates the band with the unique region, secures common regions, transfers the image data of one of the bands to the common region and associates any one of the common regions to each of the bands; a reader that reads the image data from the region associated with each band and outputs the image data for composition; a composer that composes the image data for composition with the image data to be printed; and an image former that forms an image based on the composed image data.

20 Claims, 20 Drawing Sheets

(51) Int. Cl.
*H04N 1/41* (2006.01)
*G06F 3/12* (2006.01)

(52) U.S. Cl.
CPC ............ *G06F 3/122* (2013.01); *G06F 3/1215* (2013.01); *G06F 3/1247* (2013.01)

(56) References Cited

FOREIGN PATENT DOCUMENTS

| | | |
|---|---|---|
| JP | 2006-166330 A | 6/2006 |
| JP | 2015-144364 A | 8/2015 |

* cited by examiner

BACKGROUND BAND

BACKGROUND BAND

BACKGROUND BAND

BACKGROUND BAND

BACKGROUND BAND

SUB-PATTERN 1
SUB-PATTERN 2

IMAGE FORMING APPARATUS DETERMINING COINCIDING IMAGE DATA BANDS

The entire disclosure of Japanese patent Application No. 2017-045397, filed on Mar. 9, 2017, is incorporated herein by reference in its entirety.

BACKGROUND

Technological Field

The present invention relates to an image forming apparatus that forms an image by composing image data to be printed with image data for composition such as a page number.

Description of the Related Art

There has been a request for adding information such as a page number which is not included in print data received from a PC and the like by a printing apparatus and printing the added information. In FIG. 19, an example of an outline of a flow of data in an image forming apparatus capable of coping with such a request is illustrated. In the image forming apparatus, even in a case where the page number and the like are imaged and composed in a part of a page, it is necessary to prepare image data for composition for one page. The image data for one page and the image data for composition for one page are concurrently read and composed in synchronization with an operation of an engine, and output to the engine.

Specifically, regions of an image memory and a composition image memory are secured in a main memory, and image data of each page of a print job is divided into a plurality of bands, stored in the image memory to be prepared. In the composition image memory, the image data for composition (image data) such as the page number for one page is generated. Then, the image data for composition generated in the main memory for one page is transferred to a page buffer for composition of a sub memory to be prepared. Thereafter, the image data to be printed is transferred from the image memory of the main memory to an image band buffer of the sub memory in synchronization with an engine output for each band, and concurrently performs an operation for reading the image data from the image band buffer of the sub memory and an operation for reading the image data for composition of a part corresponding to the image data from the composition page buffer of the sub memory in parallel. Then, the read image data is composed and output to the engine. These processing is sequentially performed.

In the image forming apparatus performing such processing, if the preparation of the image data of the page to be printed in the image memory and the storage of the image data for composition of the corresponding page in the composition page buffer of the sub memory are not completed, printing processing of the page by the engine cannot be started. Therefore, for example, if preparation of image data of a rear surface is not completed in time during double-side printing, the printing is temporarily stopped at the time when a principal surface has been printed, and printing is restarted after the completion of the preparation of the rear surface.

However, some models cannot temporarily stop printing between the principal surface printing and the rear surface printing. In this case, as illustrated in FIG. 20, it is desirable that the composition page buffer and the image band buffer for a plurality of pages necessary for continuous printing (20 pages are required for maintaining high productivity) be secured in the sub memory and the printing be started after the image data for the pages whose number is sufficient for the continuous printing has been prepared in the sub memory. However, a necessary memory capacity of the sub memory is enormously increased.

JP 2006-166330 A discloses an apparatus for generating a composite image by tiling an image into M×N pixels and arranging the tiled images at appropriate positions based on a management table. In this apparatus, only a part of the image to be composed is written in the management table, and composite data of only a part where the image is composed is transmitted and composed.

In addition, JP 2015-144364 A discloses a technique which does not save a white part of a form image at the time of saving the form image and saving only a part of an image to be composed and composes the image.

In an image forming apparatus which cannot temporarily stop printing between principal surface printing and rear surface printing, it is necessary to increase a capacity of a sub memory in FIG. 20 for smooth printing. However, from the viewpoint of cost, it is desirable to reduce the capacity of the sub memory.

With the methods in JP 2006-166330 A and JP 2015-144364 A, it is preferable to store the image of only a part where the composite image exists, the memory can be saved. However, since hardware which can composite the image at the specific position in one page is required, the hardware configuration becomes complicated.

SUMMARY

The present invention is intended to solve the above problems, and an object thereof is to provide an image forming apparatus which can reduce a required capacity of an output memory while employing a method for composing an image by sequentially reading image data for composition for one page from the output memory.

To achieve the abovementioned object, according to an aspect of the present invention, an image forming apparatus reflecting one aspect of the present invention comprises:

a hardware processor that:
  generates image data for composition in page units which is composed with image data to be printed; and
  divides the image data for composition into a plurality of bands;

an output memory;

a storage that determines whether image data of each band divided by the hardware processor coincides with image data of another band, secures a unique region for the band of which the image data does not coincide with that of any other bands in the output memory, transfers the image data of the band to the unique region and associates the band with the unique region, secures common regions less than the number of plurality of bands for the plurality of bands having coincided image data in the output memory, transfers the image data of one of the plurality of bands to the common region and associates any one of the common regions to each of the plurality of bands;

a reader that reads the image data from the region associated with each band and outputs the image data for composition in page units before the division;

a composer that composes the image data for composition output from the reader with the image data to be printed; and an image former that forms an image based on the composed image data output from the composer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
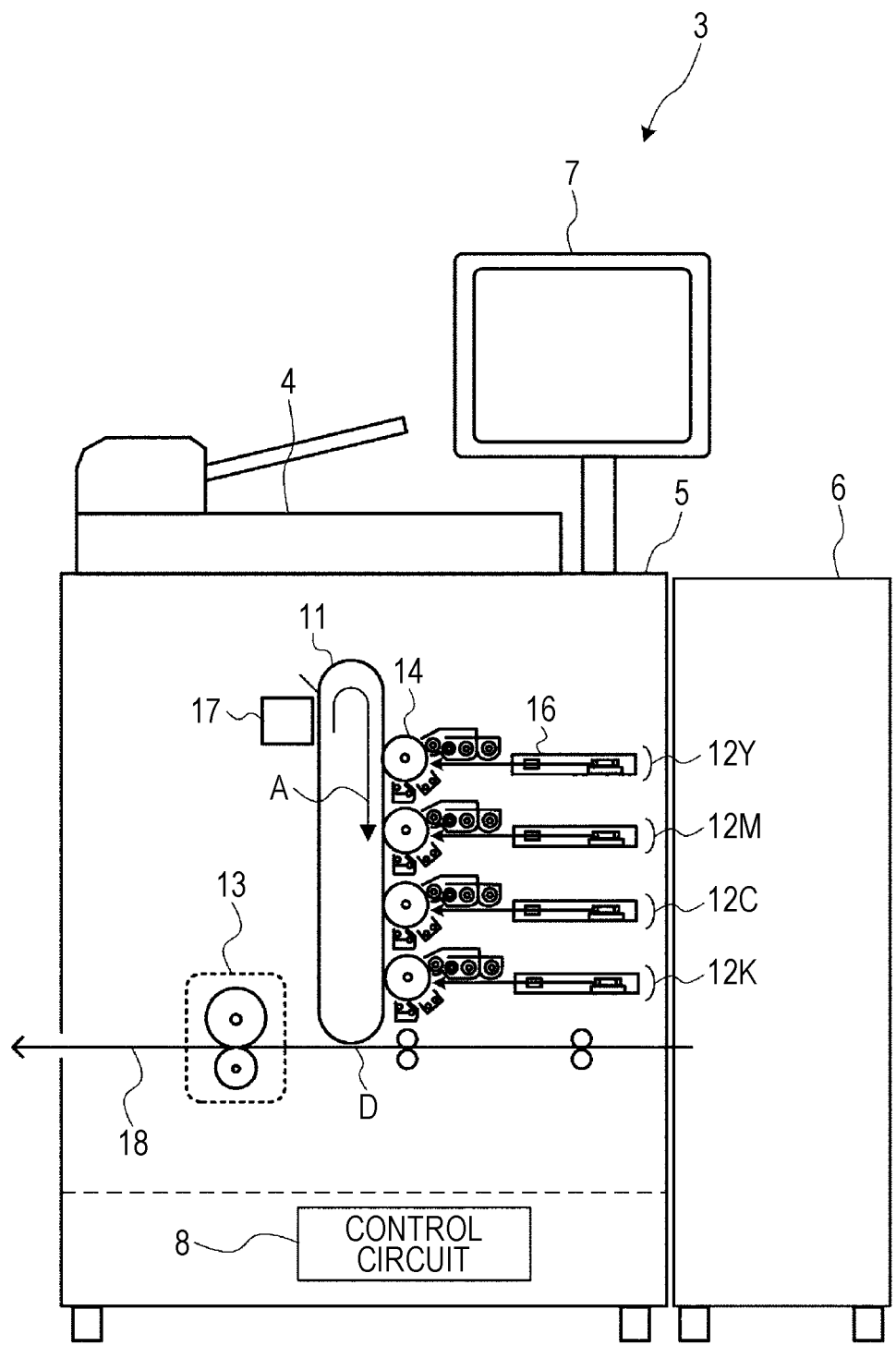
FIG. 1 is a diagram of a schematic configuration of an image forming apparatus according to an embodiment of the present invention.

FIG. 1 is a diagram of a schematic configuration of an image forming apparatus 3 according to an embodiment of the present invention. The image forming apparatus 3 has a copying function of forming and outputting a document image which has been optically read by a scanner 4 on recording paper and a printing function of forming and outputting an image rasterized based on print data input from outside on the recording paper.

The image forming apparatus 3 includes the scanner 4 which optically reads a document, an image former 5 which forming an image on the recording paper, a paper feed unit 6 which can store a large amount of recording paper and feeds recording paper one by one toward the image former 5 at the time of printing, an operation panel 7 which accepts user operations and displays various information, a control circuit 8 which controls an operation of the entire apparatus and performs image processing, and the like.

The image former 5 forms a two-dimensional image in which pixels are arranged in a main scanning direction and a sub-scanning direction orthogonal to the main scanning direction on the recording paper fed from the paper feed unit 6. The conveying direction of the recording paper is set to the sub-scanning direction. The image former 5 is a so-called electrophotographic print engine unit. The image former 5 is a so-called tandem type image forming unit. The image former 5 includes an intermediate transfer belt 11 with a predetermined width which has no ends and is stretched in a loop shape, image forming units 12Y, 12M, 12C, and 12K respectively for yellow (Y), magenta (M), cyan (C), and black (K), and a fixing device 13 which pressurizes and heats the toner image which has been formed on the recording paper to fix the image. Each of the image forming units 12Y, 12M, 12C, and 12K forms a color material image (referred to as toner image) having a single color component on the intermediate transfer belt 11. The image forming units 12Y, 12M, 12C, and 12K for respective colors are collectively referred to as an image forming unit 12.

Although the colors of the used toners are different, the image forming units 12Y, 12M, 12C, and 12K have the same structure. Each of the image forming units 12Y, 12M, 12C, and 12K has a cylindrical photosensitive drum 14 as an electrostatic latent image carrier on which an electrostatic latent image is formed on its surface, and a charging device, a developing device, a transferring device, a cleaning device, and the like which are arranged around the photosensitive drum 14. In addition, each image forming unit includes a print head 16 configured by a laser diode (LD) which is a laser element, a polygon mirror, various lenses and mirrors, and the like.

In each of the image forming units 12Y, 12M, 12C, and 12K, the photosensitive drum 14 is driven by a driving unit (not shown) and is rotated in a certain direction, and the charging device uniformly charges the photosensitive drum 14. The print head 16 scans (scans in main scanning direction) the photosensitive drum 14 with a laser beam which is on/off controlled in response to a drive signal based on the image data of the corresponding color so as to form an electrostatic latent image on the surface of the photosensitive drum 14.

The developing device visualizes the electrostatic latent image on the photosensitive drum 14 with toner. The toner image formed on the surface of the photosensitive drum 14 is transferred on the intermediate transfer belt 11 at a position where the photosensitive drum 14 has contact with the intermediate transfer belt 11. A cleaning device 17 rubs, removes, and collects the toner remaining on the surface of the photosensitive drum 14 with a blade or the like after the transfer.

The intermediate transfer belt 11 is wound around a plurality of rollers so as to circle in a direction an arrow A in FIG. 1. In a process of circulation, the images (toner images) of the respective colors are sequentially superimposed on the intermediate transfer belt 11 by the image forming units 12Y, 12M, 12C, and 12K so that a full-color image is composed. The color image is transferred from the intermediate transfer belt 11 to the recording paper at a secondary transfer position D. The toner remaining on the intermediate transfer belt 11 is removed by the cleaning device 17 provided downstream of the secondary transfer position D. The fixing device 13 is provided at a position downstream of the secondary transfer position D in the middle of a conveyance path 18 of the recording paper.

The conveyance path 18 has a function of conveying the recording paper fed from the paper feed unit 6, and making the recording paper pass through the secondary transfer position D and the fixing device 13 and discharging the recording paper to the outside (paper discharging tray or post-processing apparatus at later stage and the like). The conveyance path 18 is configured by a conveyance roller and a guide forming a conveyance route, a motor for driving the conveyance roller, and the like. Although not shown, the conveyance path 18 includes a paper sheet inverting path for double-side printing which inverts the paper sheet fed from the fixing device 13 and feeds the paper sheet to a conveyance path on the upstream of the secondary transfer position D.

The control circuit 8 includes a central processing unit (CPU), a read only memory (ROM), a random access memory (RAM), and the like as a main part. The CPU executes processing according to a program stored in the ROM so that each function of the image forming apparatus 3 is realized.

Figure 2:
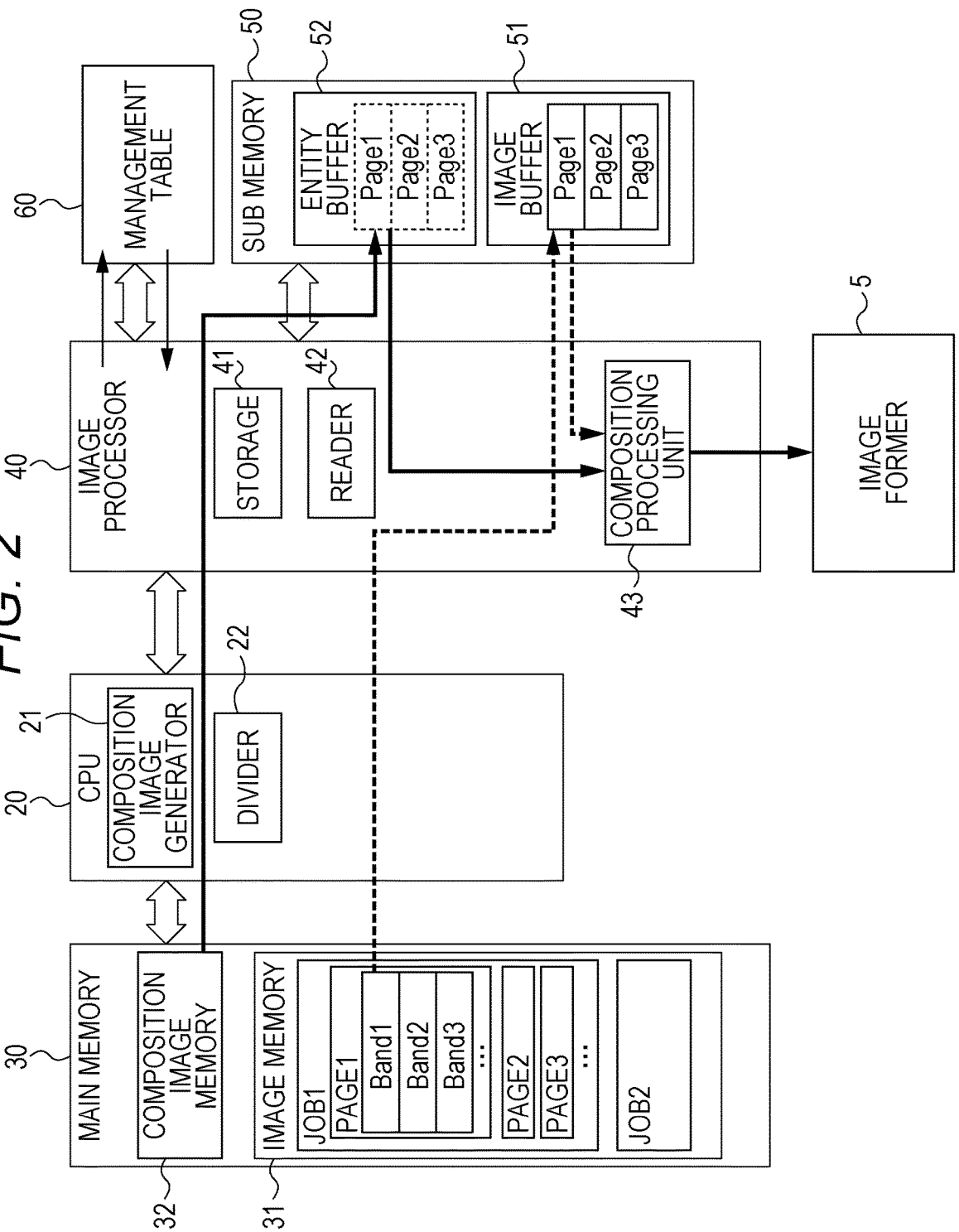
FIG. 2 is a block diagram of a structure of a part relating to output processing of image data in a control circuit included in the image forming apparatus according to the embodiment of the present invention.

FIG. 2 is a block diagram of a configuration of a part relating to output processing of the image data in the control circuit 8. A main memory 30 and an image processor 40 are connected to a CPU 20. Furthermore, a sub memory 50 and a memory to hold a management table 60 are connected to the image processor 40. The image processor 40 is configured of an integrated circuit such as an ASIC. The management table 60 may be provided in the image processor 40.

In the main memory 30, an image memory 31 which is a region where image data to be printed is stored and a composition image memory 32 which is a region where the image data for composition to be composed with the image data to be printed is stored are secured. In the image memory 31, image data for a plurality of jobs can be stored, and one job includes one or a plurality of pages of image data. The image data of each page is divided into a plurality of bands.

The image data for composition stored in the composition image memory 32 is image data in page units. The image data for composition in page units is divided into a plurality of bands. The CPU 20 has functions of a composition image generator 21 which generates the image data for composition in page units in the composition image memory 32 and a divider 22 which divides the image data for composition stored in the composition image memory 32 into the plurality of bands.

The image processor 40 functions as a storage 41, a reader 42, a composition processing unit 43, and the like. The storage 41 has an image storage function which transfers the image data stored in the image memory 31 to an image buffer 51 of the sub memory 50 in band units and stores the transferred data and a composite image storage function which transfers the image data for composition stored in the composition image memory 32 and divided in band units to an entity buffer 52 of the sub memory 50 and stores the divided data.

Regarding the composite image storage function, the storage 41 determines whether the image data in each band after the image data for composition has been divided by the divider 22 coincides with the image data in the other band and secures a unique region for the band of which the image data does not coincide with the image data in any other bands in the entity buffer 52. The storage 41 transfers the image data in the band to the unique region, associates the band with the unique region (address of region), and registers them in the management table 60. On the other hand, as a band of a part corresponding to a white background image with no characters, a common region less (for example, single common region) than the number of the plurality of bands is secured for a plurality of bands having the images coincide with each other in the entity buffer 52. The storage 41 transfers the image data of one of the plurality of bands to the common region, associates each band to the common region of any one of the plurality of bands (address of region), and registers them in the management table 60.

In this way, in the entity buffer 52, for the band having unique image data such as a part including a page number of the bands obtained by dividing the image data for composition, a storage region corresponding to each band is secured. For the bands having the common image data such the background part, a (or small number of) common storage region is secured relative to the plurality of bands, and the storage region is shared by the plurality of bands.

In accordance with a printing operation by the image former 5, the reader 42 sequentially reads the image data to be printed and the image data for composition from the image buffer 51 and the entity buffer 52, and outputs the image data to the composition processing unit 43. Regarding the reading of the image data for composition, the reader 42 reproduces the image data for composition in page units before the division by reading the image data from the region associated with each band with reference to the management table 60.

The composition processing unit 43 composes the image data to be printed and the image data for composition read by the reader 42 and outputs the composed data to the image former 5. The image former 5 forms an image on the recording paper based on the composed image data output by the composition processing unit 43.

Figure 3:
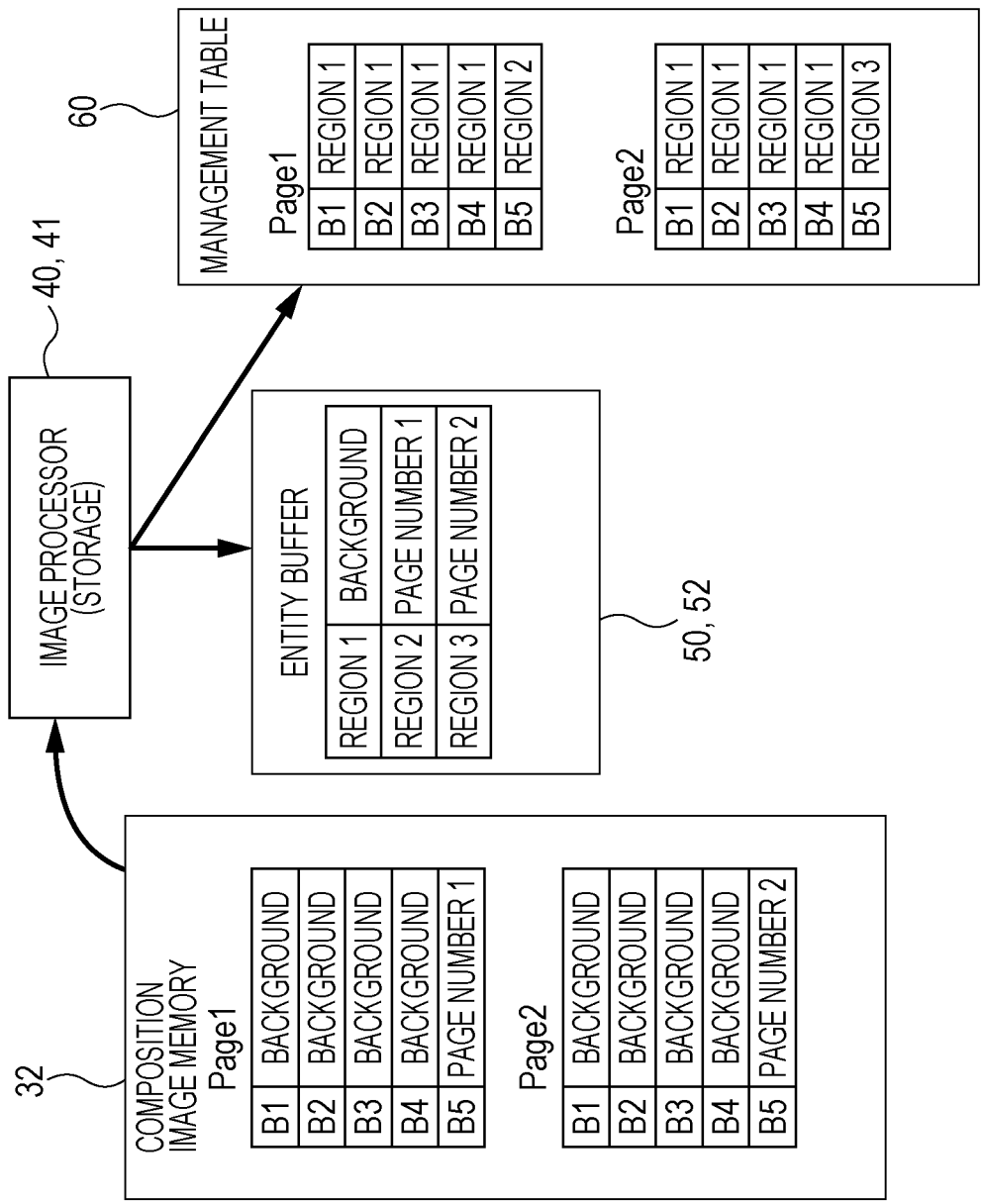
FIG. 3 is a schematic diagram of a movement when a storage of an image processor stores each band of image data for composition stored and divided in a composition image memory in an entity buffer of a sub memory.

FIG. 3 is a schematic diagram of a movement when the storage 41 of the image processor 40 stores each band of the image data for composition, which is stored in the composition image memory 32, divided by the divider 22 in the entity buffer 52 of the sub memory 50. In this example, a page 1 is divided into five bands of B1 to B5, and B1 to B4 are white background images and have the same image data. B5 is image data including the character of page number one and is unique image data in the job.

The storage 41 of the image processor 40 secures a common region 1 relative to the bands B1 to B4 in the page 1 in the entity buffer 52 and transfers the image data of the band B1 in the page 1 to the region 1. At this time, the band B1 in the page 1 is associated with the region 1 (address of region 1), the band B2 in the page 1 is associated with the region 1 (address of region 1), the band B3 in the page 1 is associated with the region 1 (address of region 1), and the band B4 in the page 1 is associated with the region 1 (address of region 1). Then, the bands B1 to B4 are registered to the management table 60. Since the band B5 in the page 1 is unique image data, a unique region 2 relative to the band B5 in the page 1 is secured in the entity buffer 52, and the image data of the band B5 in the page 1 is transferred to the region 2. Then, the band B5 in the page 1 is associated with the region 2 (address of region 2), the band B5 and the region 2 are registered in the management table 60.

Similarly, a page 2 is divided into five bands B1 to B5. The bands B1 to B4 in the page 2 are white background images and have the same image data. The band B5 in the page 2 is image data including the character of page number two and is unique image data in the job.

Since the bands B1 to B4 in the page 2 are the same image data as the bands B1 to B4 in the page 1, the storage 41 of the image processor 40 does not secure a new region relative to the bands B1 to B4 in the page 2 in the entity buffer 52, and associates the bands B1 to B4 with the region 1 (address of region 1). That is, the band B1 in the page 2 is associated with the region 1 (address of region 1), the band B2 in the page 2 is associated with the region 1 (address of region 1), the band B3 in the page 2 is associated with the region 1 (address of region 1), and the band B4 in the page 2 is associated with the region 1 (address of region 1). Then, the bands B1 to B4 are registered to the management table 60. Since the band B5 in the page 2 is unique image data, a unique region 3 relative to the band B5 in the page 2 is secured in the entity buffer 52, and the image data of the band B5 in the page 2 is transferred to the region 3. Then, the band B5 in the page 2 is associated with the region 3 (address of region 3), the band B5 and the region 3 are registered to the management table 60.

In this way, with the regions for three bands secured in the entity buffer 52 of the sub memory 50 and the management table 60, the image data for composition for two pages (corresponding to ten bands) can be virtually stored, and a storage capacity required for the sub memory 50 can be considerably reduced. In an actual page, since the number of bands corresponding to the background part is more than that illustrated in FIG. 3, an effect of saving the memory gets larger.

Figure 4:
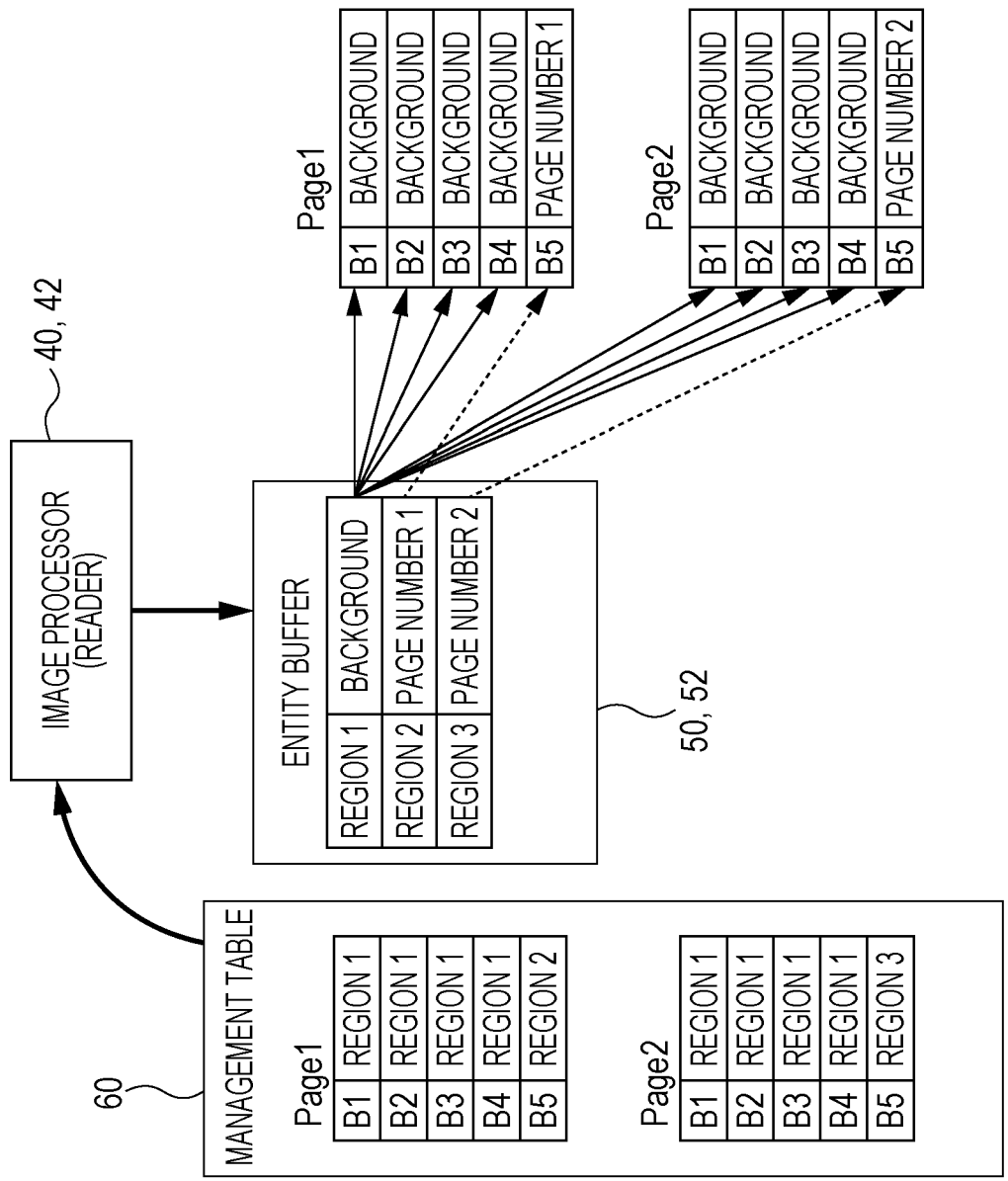
FIG. 4 is a schematic diagram of processing of reproducing original image data for composition in page units before division by using a management table and the image data stored in the entity buffer by a reader of the image processor.

FIG. 4 is a schematic diagram of processing of reproducing the image data for composition in page units before division by using the management table 60 and the image data stored in the entity buffer 52 by the reader 42 of the image processor 40. When reproducing the page 1, with reference to the management table 60 of the page 1, the reader 42 reads the image data corresponding to the bands B1 to B4 in the page 1 from the region 1 of the entity buffer 52 and reads the image data corresponding to the band B5 in the page 1 from the region 2 of the entity buffer 52 so as to reproduce the image data for composition of the page 1 before the division.

When reproducing the page 2, with reference to the management table 60 of the page 2, the reader 42 reads the image data corresponding to the bands B1 to B4 in the page 2 from the region 1 of the entity buffer 52 and reads the image data corresponding to the band B5 in the page 2 from the region 3 of the entity buffer 52 so as to reproduce the image data for composition of the page 2 before the division.

Figure 5:
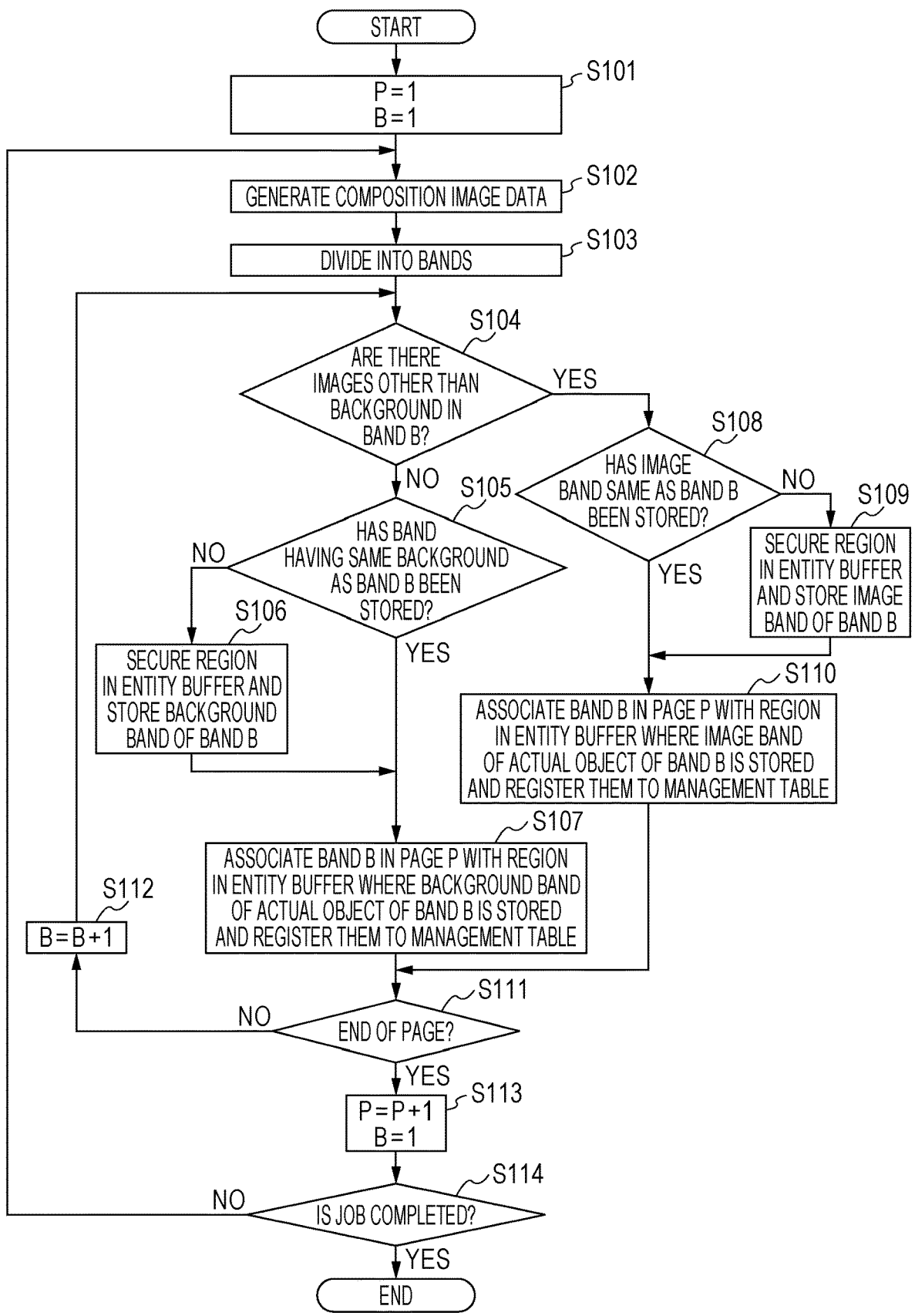
FIG. 5 is a flowchart of processing in which the control circuit divides the image data for composition and stores the divided data in the sub memory.

FIG. 5 is a flowchart of processing in which the control circuit 8 (mainly, storage 41) divides the image data for composition and stores the divided data in the sub memory 50. First, a variable P indicating a page and a variable B indicating a band are initialized to one (step S101). Next, the composition image generator 21 of the CPU 20 generates the image data for composition for one page in the composition image memory 32 (step S102), and the divider 22 divides the generated data into a plurality of bands (step S103). The band size may be a fixed value which has been previously determined or may be a band size corresponding to an image content.

It is determined whether a band B (band indicated by value of variable B) includes an image other than the background (step S104). If the band B is not the band which does not include the image other than the background (referred to as background band) (step S104; No), whether the background band same as the band B has been already stored in the entity buffer 52 is checked (step S105). If the background band same as the band B has not been stored in the entity buffer 52 (step S105; No), a new region is secured in the entity buffer 52, and the image data of the band B is transferred to the new region (step S106). Then, the procedure proceeds to step S107. If the background band same as the band B has already been stored in the entity buffer 52 (step S105; Yes), the procedure proceeds to step S107.

In step S107, the band B in a page P is associated with a region in the entity buffer 52 (address of region) where the image data which is an actual object of the band B is stored, and the band B and the region are registered to the management table 60. The procedure proceeds to step S111.

If the band B is a band including the image other than the background (referred to as image band) (step S104; Yes), whether the image band same as the band B has been already stored in the entity buffer 52 is checked (step S108). If the image band same as the band B has not been stored in the entity buffer 52 (step S108; No), a new region is secured in the entity buffer 52, and the image data of the band B is transferred to the new region (step S109). Then, the procedure proceeds to step S110. If the image band same as the band B has been stored in the entity buffer 52 (step S108; Yes), the procedure proceeds to step S110.

In step S110, the band B in the page P is associated with a region (address of region) where the image data which is an actual object of the band B is stored, and the band B and the region are registered in the management table 60. The procedure proceeds to step S111.

In step S111, it is checked whether the page ends. If the page does not end (step S111; No), the value of the variable B is incremented by one (step S112), and the procedure proceeds to step S104, and the procedure is continued.

In a case where the page ends (step S111; Yes), the variable P is incremented by one, and the variable B is initialized to one (step S113). Then, it is checked whether the job is completed (step S114). If the job is not completed (step S114; No), the procedure proceeds to step S102, and the procedure is continued. If the job is completed (step S114; Yes), the procedure is terminated.

Figure 6:
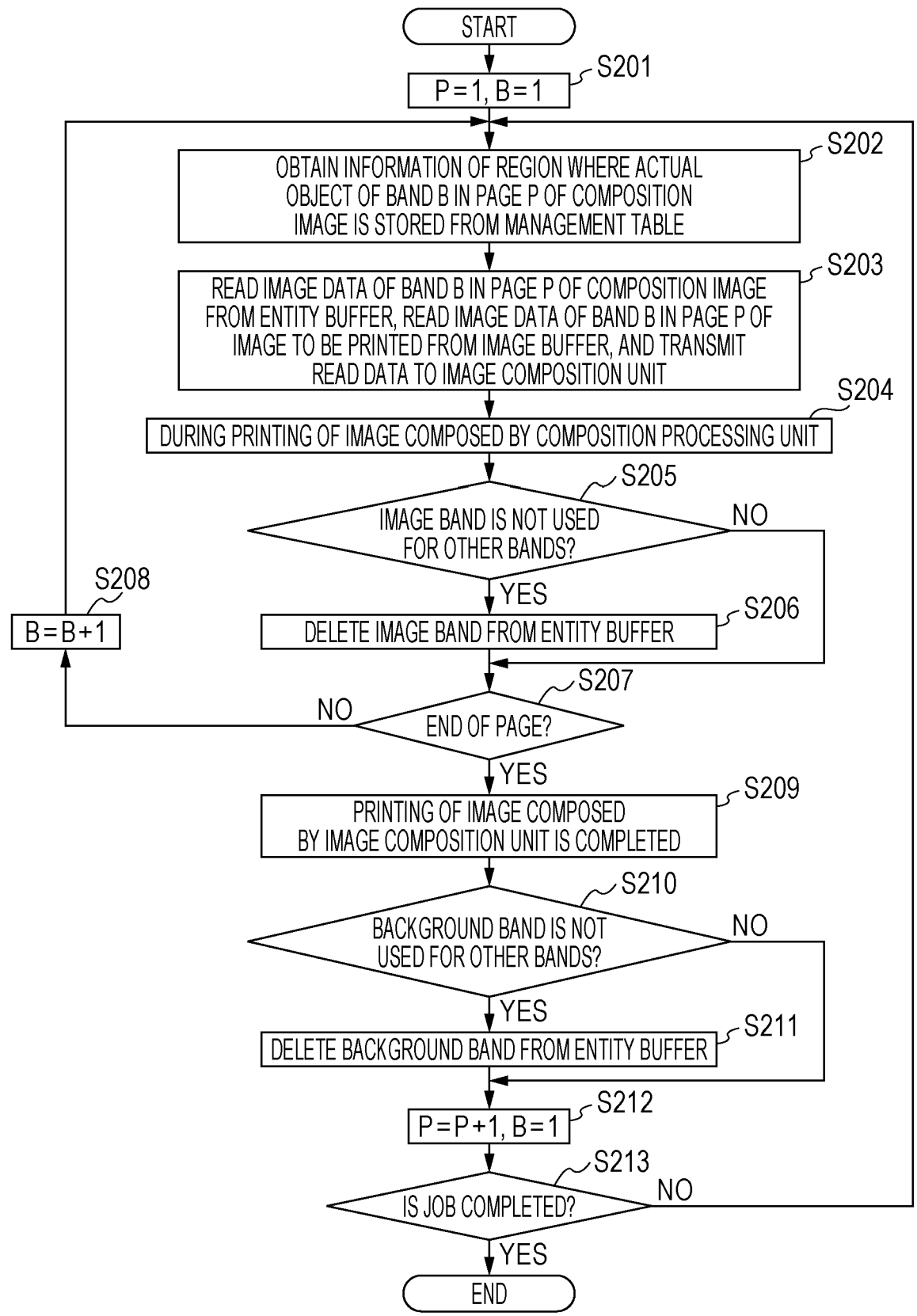
FIG. 6 is a flowchart of processing in which the control circuit (reader) reproduces the image data for composition in page units.

FIG. 6 is a flowchart of processing in which the control circuit 8 (reader 42 of image processor 40) reproduces the image data for composition in page units. First, the variable P indicating a page and the variable B indicating a band are initialized to one (step S201). Next, an address of the region in the entity buffer 52 where the image data of the actual object of the band B in the page P is stored is obtained from the management table 60 (step S202). Next, the image data of the actual object of the band B in the page P is read from the region in the entity buffer 52 indicated by the address, and the image data of the band B in the page P is read from the image buffer 51. Then, the read image data is transmitted to the composition processing unit 43 (step S203).

The composition processing unit 43 composes the image data and outputs the data to the image former 5, and prints the data (step S204).

If the band B is the image band, the management table 60 is searched to check whether another image band uses the region where the image data of the actual object of the band B is stored (step S205). If the another image band does not use the region (step S205; Yes), the image data of the actual object of the band B is deleted from the entity buffer 52 (step S206), and the procedure proceeds to step S207. If the another image band uses the region (step S205; No), the image data is not deleted from the entity buffer 52, and the procedure proceeds to step S207.

In step S207, it is determined whether the page ends. If the page does not end (step S207; No), the value of the variable B is incremented by one (step S208), and the procedure returns to step S202. Then, the procedure is continued.

If the page ends (step S207; Yes), completion of the printing of the image in the page composed by the composition processing unit 43 is waited (step S209). When the printing is completed, whether the background band used in this page is used as the background band of the other page is checked (step S210). When the background band is not used in the other page (step S210; Yes), the background band used in this page is deleted from the entity buffer 52 (step S211), and the procedure proceeds to step S212. If the background band is used in the other page (step S201; No), the procedure proceeds to step S212 without deleting the background band.

In step S212, the variable P is incremented by one, and the variable B is initialized to one. Then, it is checked whether the job is completed (step S213). If the job is not completed (step S213; No), the procedure proceeds to step S202, and the procedure is continued. If the job is completed (step S213; Yes), the procedure is terminated.

By deleting the image data in the region secured in the entity buffer 52 at the above timing to open the region, the region can be opened at an early timing, and the opened region can be allocated to the next page and the next job. Accordingly, the memory capacity required as the entity buffer 52 can be reduced. It is not necessary to perform the processing for deleting the image data in the entity buffer 52 and opening the region at the timing illustrated in FIG. 6. For example, it is preferable that the image data in all the regions secured for the job be deleted at the timing when the job is completed and the regions be opened.

Second Embodiment

An image forming apparatus according to a second embodiment includes a plurality of channels of direct memory accesses (DMA) which performs processing for writing image data to an entity buffer 52 of a sub memory 50 and processing for reading the image data from the entity buffer 52 of the sub memory 50 and transfers data by concurrently using the DMAs in parallel. The image forming apparatus according to the second embodiment is different from that according to the first embodiment in this point. The other points are the same as those of the first embodiment, and explanation thereof will be omitted.

Figure 7:
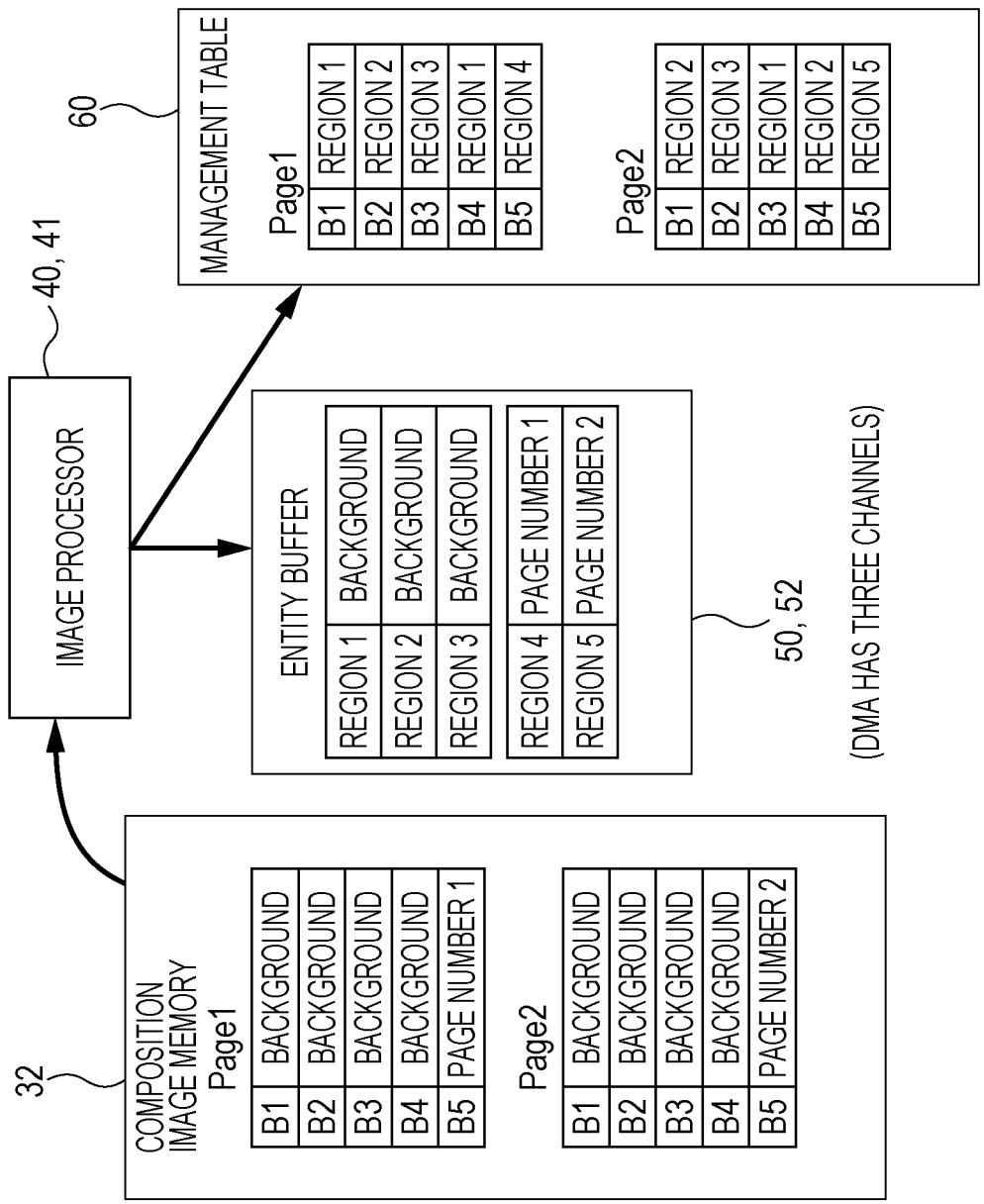
FIG. 7 is a schematic diagram of a movement when a storage of an image processor of an image forming apparatus according to a second embodiment stores each band of image data for composition stored and divided in a composition image memory in an entity buffer of a sub memory.

FIG. 7 is a schematic diagram of a movement when a storage 41 of an image processor 40 of an image forming apparatus 3 according to the second embodiment stores each band of the image data for composition, which is stored in a composition image memory 32, divided by a divider 22 in the entity buffer 52 of the sub memory 50. The division states of pages 1 and 2 in the composition image memory 32 are the same as those in FIG. 3. It is assumed that the DMA have three channels, i.e., a channel 0, a channel 1, and a channel 2.

The storage 41 of the image processor 40 secures three common regions 1, 2, and 3 as many as the number of channels of the DMA in the entity buffer 52 with respect to bands B1 to B4 in the page 1 and eight background bands of the bands B1 to B4 in the page 2 and transfers the image data of the band B1 in the page 1 to each of the regions 1, 2, and 3. Alternatively, if the image data to be transferred is the same, the image data may be transferred to the three regions 1, 2, and 3 from different bands (for example, B1, B2, and B3).

The band B1 in the page 1 is associated with the region 1 (address of region 1), the band B2 in the page 1 is associated with the region 2 (address of region 2), the band B3 in the page 1 is associated with the region 3 (address of region 3), and the band B4 in the page 1 is associated with the region 1. Then, the bands B1 to B4 are registered to the management table 60. That is, the three common regions 1, 2, and 3 are sequentially and cyclically allocated, and any one of the common regions is associated with each of the plurality of bands.

Since the band B5 in the page 1 is unique image data, a unique region 4 relative to the band B5 in the page 1 is secured in the entity buffer 52, and the image data of the band B5 in the page 1 is transferred to the region 4. Then, the band B5 in the page 1 is associated with the region 4 (address of region 4), the band B5 and the region 4 are registered to the management table 60.

Since the bands B1 to B4 in the page 2 are the same image data as the bands B1 to B4 in the page 1, the storage 41 of the image processor 40 does not secure a new region in the entity buffer 52 with respect to the bands B1 to B4 in the page 2 and cyclically uses and associates the regions 1, 2, and 3 which have been already secured. That is, as a continuation of the page 1, the band B1 in the page 2 is associated with the region 2 (address of region 2), the band B2 in the page 2 is associated with the region 3 (address of region 3), the band B3 in the page 2 is associated with the region 1 (address of region 1), and the band B4 in the page 2 is associated with the region 2 (address of region 2). Then, the bands B1 to B4 are registered to the management table 60. Since the band B5 in the page 2 is unique image data, a unique region 5 relative to the band B5 in the page 2 is secured in the entity buffer 52, and the image data of the band B5 in the page 2 is transferred to the region 5. Then, the band B5 in the page 2 is associated with the region 5 (address of region 5), the band B5 and the region 5 are registered to the management table 60.

Figure 8:
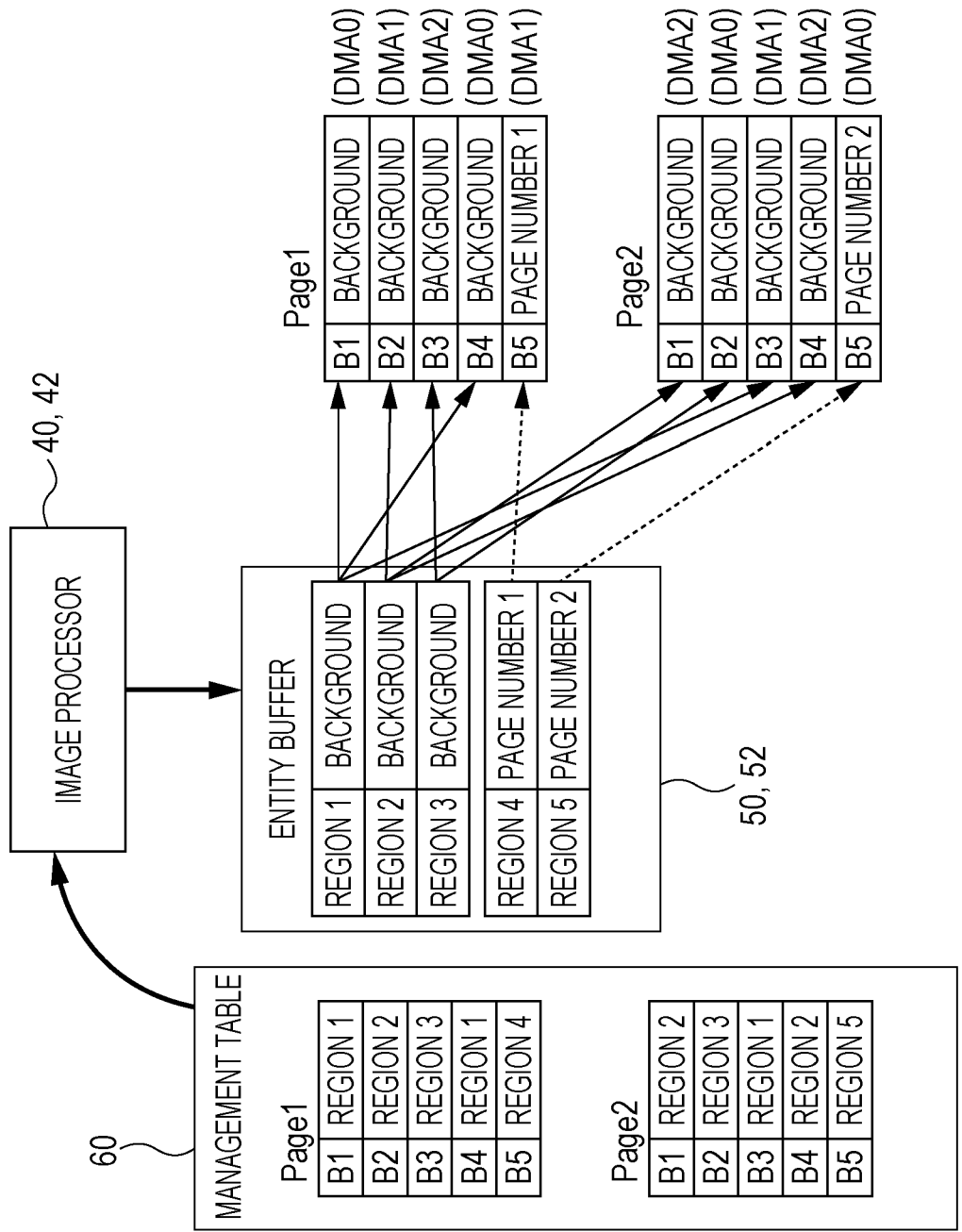
FIG. 8 is a schematic diagram of processing of reproducing original image data for composition in page units before division by using a management table and the image data stored in the entity buffer by a reader of the image processor.

FIG. 8 is a schematic diagram of processing of reproducing original image data for composition in page units before division by using the management table 60 and the image data stored in the entity buffer 52 by the reader 42 of the image processor 40. When reproducing the page 1, with reference to the management table 60 of the page 1, the reader 42 reads the image data corresponding to the bands B1 to B4 in the page 1 from any one of the regions 1 to 3 of the entity buffer 52 and reads the image data corresponding to the band B5 in the page 1 from the region 4 of the entity buffer 52 so as to reproduce the image data for composition of the page 1 before the division.

At this time, three DMA channels are sequentially and cyclically allocated to each band to perform reading. Here, the image data of the band B1 in the page 1 is read from the region 1 of the entity buffer 52 by using the DMA channel 0, and concurrently, the image data of the band B2 in the page 1 is read from the region 2 of the entity buffer 52 by using the DMA channel 1, and the image data of the band B3 in the page 1 is read from the region 3 of the entity buffer 52 by using the DMA channel 2. Then, next DMA transfer is set and started in order of the completion of transfer. The image data of the band B4 in the page 1 is read from the region 1 of the entity buffer 52 by using the DMA channel 0, and the image data of the band B5 in the page 1 is read from the region 4 of the entity buffer 52 by using the DMA channel 1.

When reproducing the page 2, with reference to the management table 60 of the page 2, the reader 42 reads the image data corresponding to the bands B1 to B4 in the page 2 from any one of the regions 1 to 3 of the entity buffer 52 and reads the image data corresponding to the band B5 in the page 2 from the region 5 of the entity buffer 52 so as to reproduce the image data for composition of the page 2 before the division. At this time, to be the continuation of the page 1, the DMA channels are cyclically used.

Specifically, the image data of the band 1 in the page 2 is read from the region 2 of the entity buffer 52 by using the DMA channel 2. Next DMA transfer is set and started in order of the completion of transfer. The image data of the band 2 in the page 2 is read from the region 3 of the entity buffer 52 by using the DMA channel 0, the image data of the band 3 in the page 2 is read from the region 1 of the entity buffer 52 by using the DMA channel 1, the image data of the band 4 in the page 2 is read from the region 2 of the DMA channel 52 by using the DMA channel 2, and the image data of the band 5 in the page 2 is read from the region 5 of the entity buffer 52 by using the DMA channel 0.

In this way, since the regions of the background bands as many as the DMA channels are secured in the entity buffer 52 and these regions and the DMA channels are sequentially and cyclically used, concurrent accesses to the same region by the plurality of DMA channels can be avoided, and the image data can be efficiently transferred. That is, when the plurality of DMA channels concurrently accesses the same region in the memory, an efficiency for transferring the image data is significantly deteriorated. However, by allocating the plurality of regions as the background bands to the entity buffer 52 and cyclically using the plurality of regions and the plurality of DMA channels, the deterioration in the efficiency for transferring the image data is prevented. If the plurality of DMA channels is controlled not to concurrently access the same region, it is not necessary to cyclically allocate the regions and the DMA channels.

Figure 9:
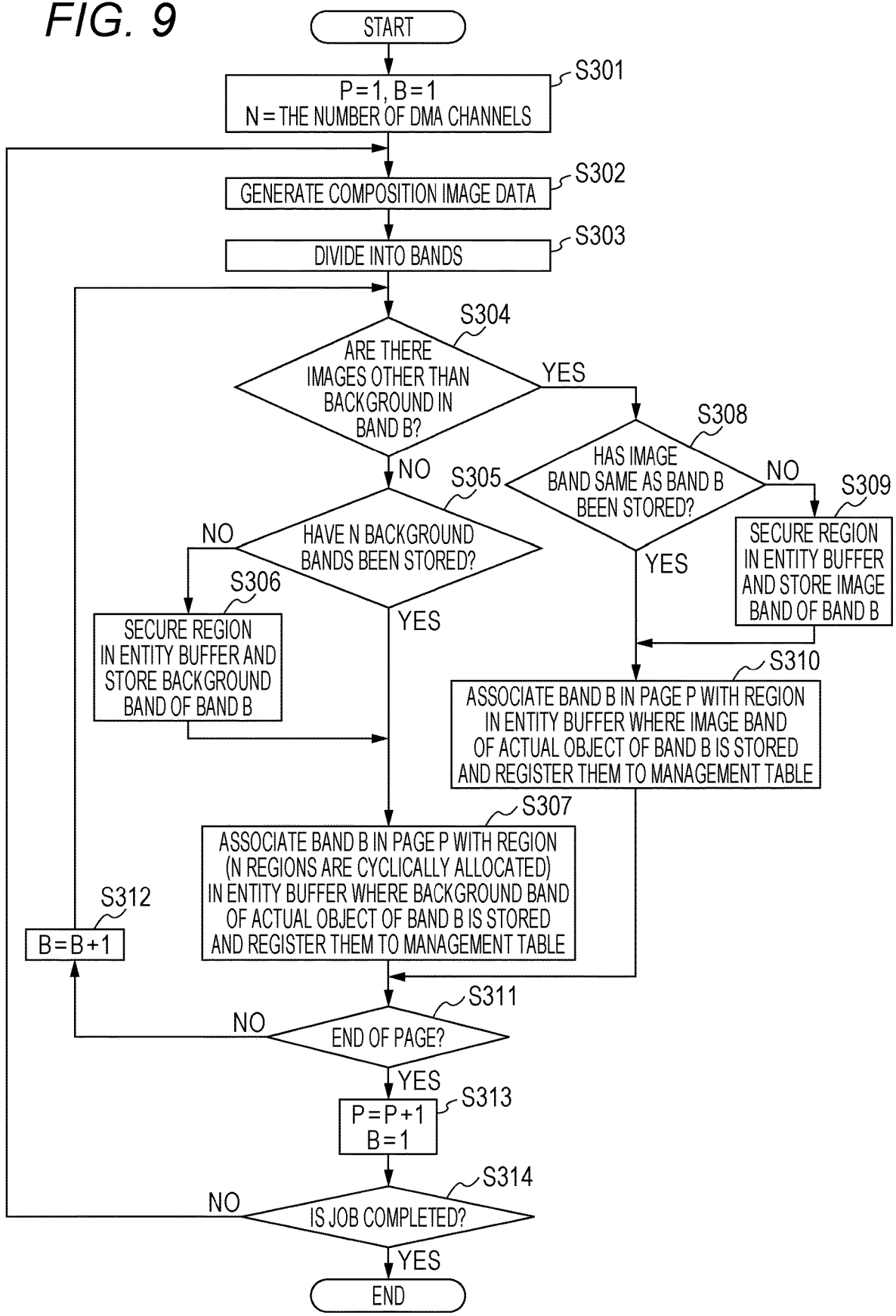
FIG. 9 is a flowchart of processing in which a control circuit according to the second embodiment divides the image data for composition and stores the divided data in the sub memory.

FIG. 9 is a flowchart of processing in which a control circuit 8 (mainly, storage 41) according to the second embodiment divides the image data for composition and stores the divided data in the sub memory 50. First, a variable P indicating a page and a variable B indicating a band are initialized to one, and the number of DMA channels is set to N (step S301). Next, the composition image generator 21 of the CPU 20 generates the image data for composition for one page in the composition image memory 32 (step S302), and the divider 22 divides the generated data into a plurality of bands (step S303). The band size may be a fixed value which has been previously determined or may be a band size corresponding to an image content.

It is determined whether a band B (band indicated by value of variable B) includes an image other than the background (step S304). If the band B is the background band which does not include the image other than the background (step S304; No), whether N background bands same as the band B have been already stored in the entity buffer 52 is checked (step S305). If the N background bands same as the band B have not been stored in the entity buffer 52 (step S305; No), a new region is secured in the entity buffer 52, and the image data of the band B is transferred to the new region (step S306). Then, the procedure proceeds to step S307. If the N background bands same as the band B have already been stored in the entity buffer 52 (step S305; Yes), the procedure proceeds to step S307.

In step S307, the band B in the page P is associated with a region (address of region) where the image data which is an actual object of the band B is stored, and the band B and the region are registered to the management table 60. The procedure proceeds to step S311.

If the band B is an image band including the image other than the background (step S304; Yes), whether the image band same as the band B has been already stored in the entity buffer 52 is checked (step S308). If the image band same as the band B has not been stored in the entity buffer 52 (step S308; No), a new region is secured in the entity buffer 52, and the image data of the band B is transferred to the new region (step S309). Then, the procedure proceeds to step S310. If the image band same as the band B has been stored in the entity buffer 52 (step S308; Yes), the procedure proceeds to step S310.

In step S310, the band B in the page P is associated with the region (address of region) where the image data which is the actual object of the band B is stored, and the band B and the region are registered to the management table 60. The procedure proceeds to step S311.

In step S311, it is checked whether the page ends. If the page does not end (step S311; No), the value of the variable B is incremented by one (step S312), and the procedure proceeds to step S304, and the procedure is continued.

In a case where the page ends (step S311; Yes), the variable P is incremented by one, and the variable B is initialized to one (step S313). Then, it is checked whether the job is completed (step S314). If the job is not completed (step S314; No), the procedure proceeds to step S302, and the procedure is continued. If the job is completed (step S314; Yes), the procedure is terminated.

Figure 10:
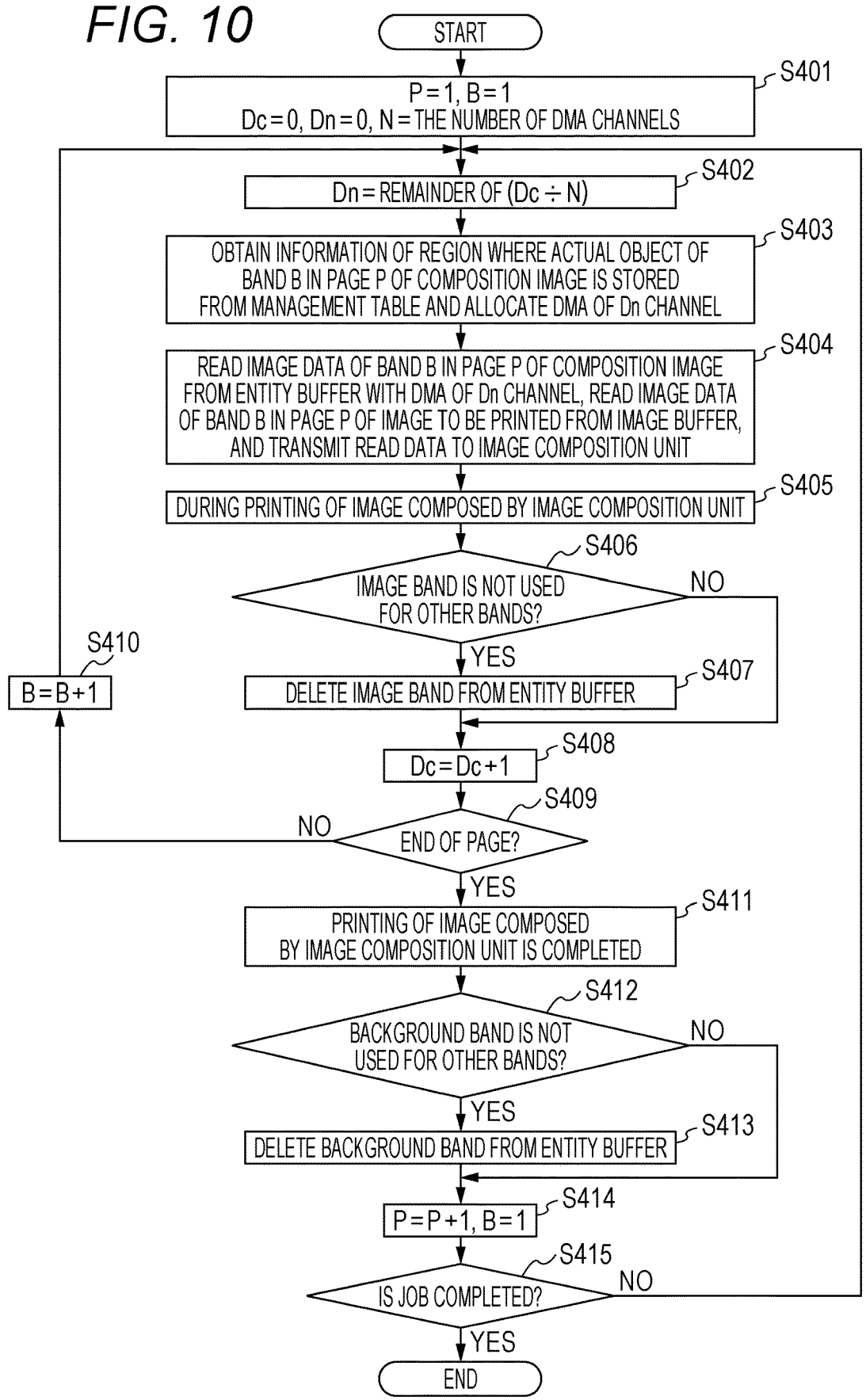
FIG. 10 is a flowchart of processing in which the control circuit (reader) according to the second embodiment reproduces the image data for composition in page units.

FIG. 10 is a flowchart of processing in which the control circuit 8 (reader 42 of image processor 40) according to the second embodiment reproduces the image data for composition in page units. First, the variable P indicating the page and the variable B indicating the band are initialized to one, variables Dc and Dn are set to zero, and the number of DMA channels is set to N (step S401).

Next, Dn is set to a remainder of Dc N (step S402). Then, address information of the region where the image data of the actual object of the band B in the page P is stored is obtained from the management table 60, and the Dn channel of the DMA is allocated to read the image data (step S403). The image data of the actual object of the band B in the page P is read by using the Dn channel of the DMA from the region indicated by the address information from the entity buffer 52, and the image data of the band B in the page P is read from the image buffer 51. Then, the image data is transmitted to the composition processing unit 43 (step S404).

The composition processing unit 43 composes the image data and outputs the data to the image former 5, and prints the data (step S405).

If the band B is the image band, the management table 60 is searched to check whether another image band uses the region where the image data of the actual object of the band B is stored (step S406). If the another image band does not use the region (step S406; Yes), the image data of the actual object of the band B is deleted from the entity buffer 52 (step S407), and the procedure proceeds to step S408. If the another image band uses the region (step S406; No), the image data is not deleted from the entity buffer 52, and the procedure proceeds to step S408.

In step S408, Dc is incremented by one, and after that, it is determined whether the page ends (step S409). If the page does not end (step S409; No), the variable B is incremented by one (step S410), and the procedure returns to step S402. The procedure is continued.

If the page ends (step S409; Yes), completion of the printing of the image of the page composed by the composition processing unit 43 is waited (step S411). When the printing is completed, whether the background band used in this page is used as the background band of the other page is checked (step S412). When the background band is not used in the other page (step S412; Yes), the background band used in this page is deleted from the entity buffer 52 (step S413), and the procedure proceeds to step S414. If the background band is used in the other page (step S412; No), the procedure proceeds to step S414 without deleting the background band.

In step S414, the variable P is incremented by one, and the variable B is initialized to one. Then, it is checked whether the job is completed (step S415). If the job is not completed (step S415; No), the procedure proceeds to step S402, and the procedure is continued. If the job is completed (step S415; Yes), the procedure is terminated.

Third Embodiment

In a third embodiment, in a case where a background part of an image expressed by image data for composition is made by repetition of the same image patterns (pattern and fixed pattern), a divider 22 adjusts the band width when the image data for composition is divided so that the width matches a repetition period of the image patterns.

Figure 11A:
FIGS. 11A to 11C are diagrams of image data for composition formed by repeating image patterns, a single image pattern (background band) as a unit to divide the image data for composition, and a state where the image data for composition is divided into bands in image pattern units.
Figure 11B:
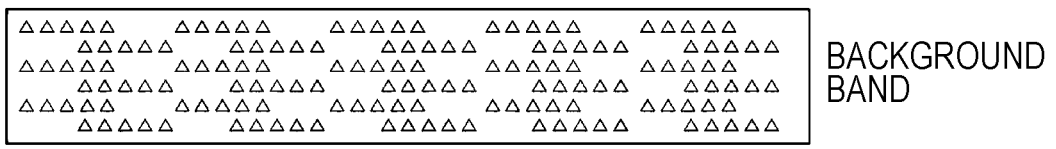
Figure 11C:

For example, since patterns are repeated at periods illustrated in FIG. 11B in image data for composition illustrated in FIG. 11A, the image data for composition is divided so that the image in the range illustrated in FIG. 11B forms a single background band. In FIG. 11C, a state where the image data for composition is divided in background band units illustrated in FIG. 11B is illustrated.

Figure 12A:
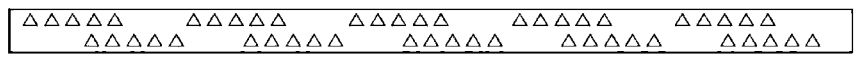
FIGS. 12A and 12B are diagrams of examples in which the image data for composition as in FIGS. 11A to 11C is divided by an image pattern having different repetition periods.
Figure 12B:
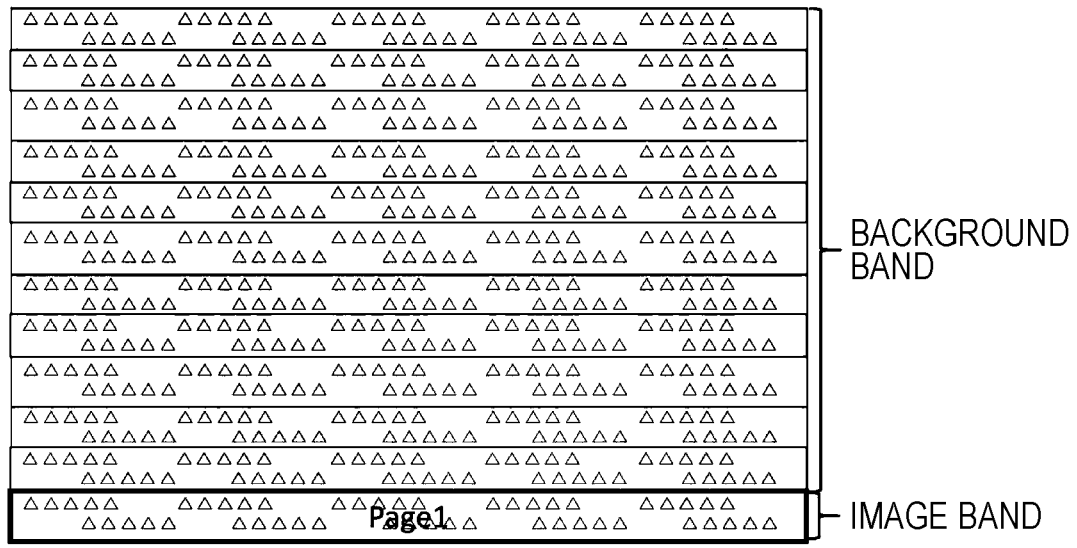

FIGS. 12A and 12B are diagrams of examples in which the image data for composition same as that in FIG. 11A is divided by image patterns with another repetition period. In FIG. 12A, one background band is illustrated, and in FIG. 12B, a state where the image data for composition illustrated in FIG. 11A is divided into the background bands having the size illustrated in FIG. 12A. In this example, the final band is an image band including a page number.

Fourth Embodiment

Figure 13A:
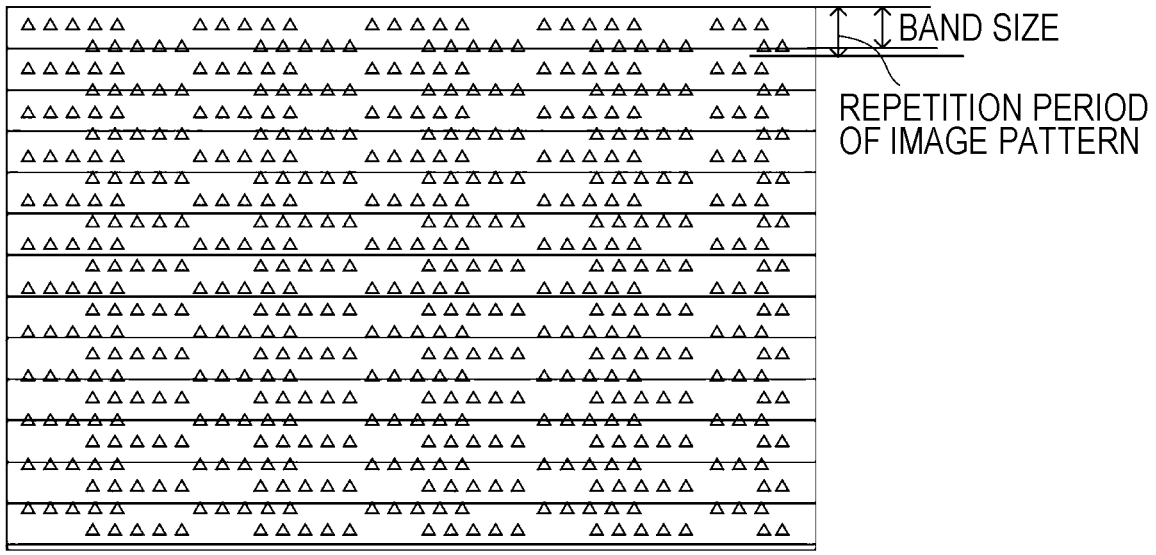
FIGS. 13A and 13B are diagrams of an example and image data for composition in which the repetition period of the image pattern does not coincide with a band size and a variable magnification example of the same.
Figure 13B:
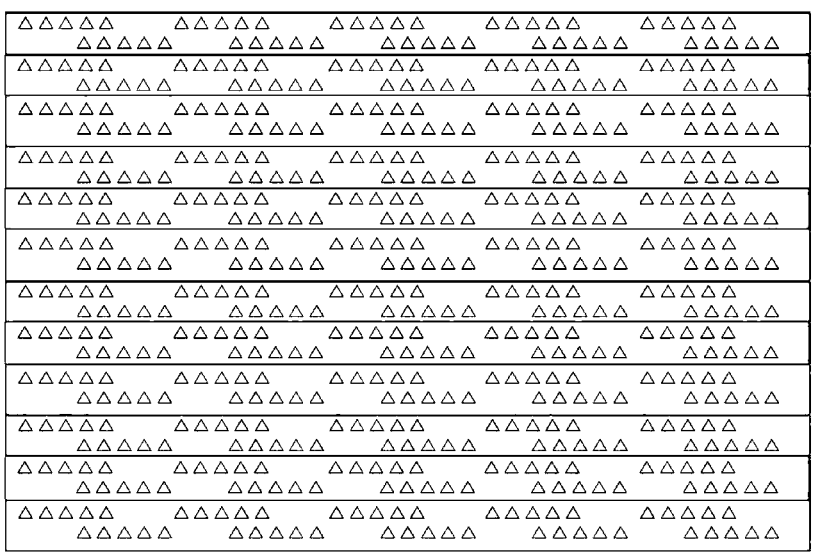

In the third embodiment, the band size at the time of the division is adjusted according to the repetition period of the image patterns. However, in a case where the band size is fixed, for example, in a case where the band sizes at the time of the division by the divider and composition by a composition processing unit 43 are fixed, the image data for composition is magnified so that the repetition period of the image pattern coincides with the band size. In the example in FIG. 13A, the repetition period of the image pattern does not coincide with the band size. In the third embodiment, a control circuit unit 8 has a function of a magnification part for magnifying the image data for composition so that the period of the image pattern coincides with the fixed band size. In FIG. 13B, a state is illustrated where the repetition period of the image pattern coincides with the band size by magnification. The magnification is performed by a CPU 20 and the like before the division, or an image processor 40 magnifies the image data after the division and stores the data to an entity buffer 52 of a sub memory 50.

Fifth Embodiment

Figure 14A:
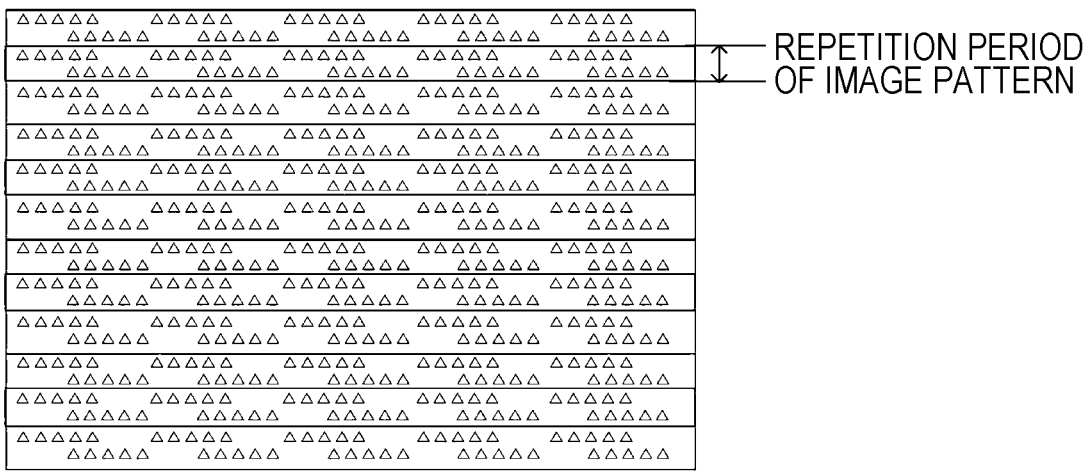
FIGS. 14A to 14C are diagrams of an example in which the single image pattern forming the image data for composition is divided into a plurality of sub-patterns.
Figure 14B:
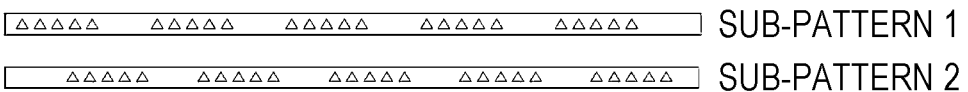
Figure 14C:
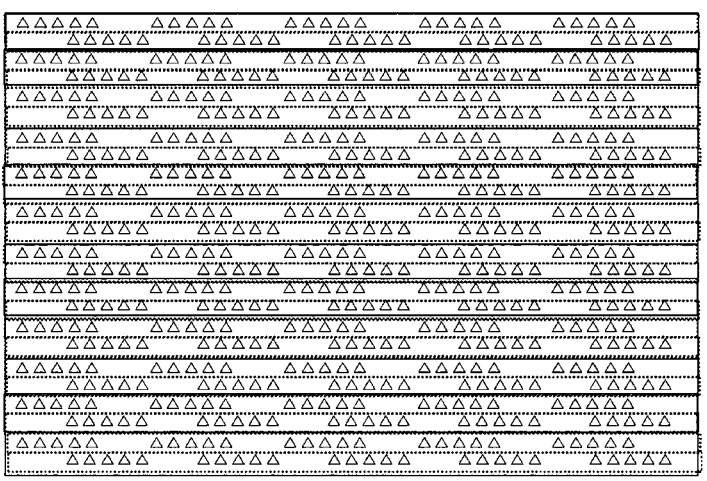

In a case where a background part of an image expressed by image data for composition is made by repetition of the same image patterns, the image pattern is divided into a plurality of sub-patterns, and the image data for composition is divided into bands for each sub-pattern. For example, a single image pattern included in the image data for composition illustrated in FIG. 14A is divided into sub-patterns 1 and 2 having the same size, as illustrated in FIG. 14B. Then, as illustrated in FIG. 14C, the entire image data for composition is divided into band for each sub-pattern.

Figure 15:
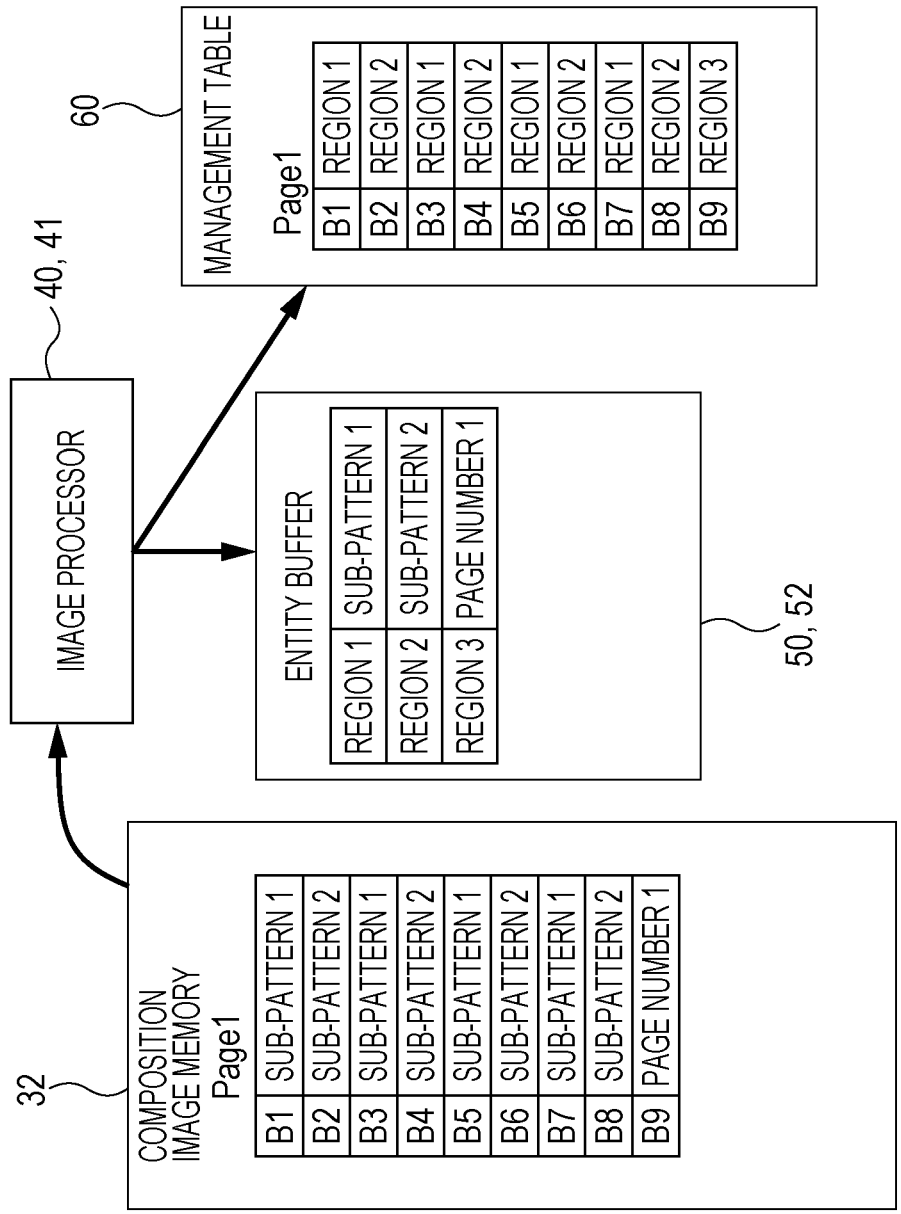
FIG. 15 is a diagram of an example of a state of the entity buffer and the created management table in a case where the image pattern is divided into the plurality of sub-patterns as illustrated in FIGS. 14A to 14C.

In FIG. 15, a state of an entity buffer 52 at this time and a created management table 60 are illustrated. A storage 41 secures a common background band 1 (region 1) relative to a plurality of bands (B1, B3, B5, and B7) corresponding to image data with the sub-pattern 1 in the entity buffer 52, transfers and stores the image data with the sub-pattern 1 to the background band 1, and associates the background band 1 (region 1) with the all the bands with the sub pattern 1. Furthermore, the storage 41 secures a common background band 2 (region 2) relative to a plurality of bands (B2, B4, B6, and B8) having the image data with the sub-pattern 2, transfers and stores the image data with the sub-pattern 2 to the background band 2, and associates the background band 2 (region 2) with all the bands with the sub-pattern 2.

In this way, the storage 41 secures a common region for each sub-pattern included in a single image pattern in the entity buffer 52, stores the image with the sub-pattern corresponding to the common region to each common region, and associates each band, which is a divided part of the image data for composition for each sub-pattern, with the common region where the image data (sub-pattern) of the band is stored.

The image pattern may be divided into three or more sub-patterns.

In a case where a plurality of DMA channels is included, the reader 42 cyclically allocates the plurality of DMA channels to each band in read order, reads the image data of each band stored in the entity buffer 52, and reproduces the image data for composition in page units. However, it is desirable that the number of DMA channels be equal to or less than the number of common regions secured in the entity buffer 52 relative to the sub-patterns so as to avoid access competition to the same memory.

Sixth Embodiment

A sixth embodiment is an example in a case where a divider 22 divides image data for composition into bands as dividing an image pattern into a plurality of sub-patterns whose number is less than the number of DMA channels. In this case, a plurality of common regions is secured for a single sub-pattern.

For example, similarly to FIGS. 14A to 14C, in a case where a single image pattern is divided into sub-patterns 1 and 2, when four DMA channels (or three) are available, two common regions (regions 1 and 2) are secured in an entity buffer 52 for the sub-pattern 1, and two common regions (regions 3 and 4) are secured for the sub-pattern 2.

When it is assumed that the number of sub-patterns divided from the single image pattern be Q, the number of common regions to be secured for the single sub-pattern be M, and the number of DMA channels be N, it is necessary for M to be an integer which satisfies $Q \times M \geq N$. In addition, it is desirable that M be the minimum value under the above condition.

The image data with the sub-pattern 1 is transferred and stored to the regions 1 and 2 corresponding to the sub-pattern 1, and the image data with the sub-pattern 2 is transferred and stored to the regions 3 and 4 corresponding to the sub-pattern 2. The regions 1 and 2 are sequentially and cyclically used and associated with the band corresponding to the sub-pattern 1 among the bands obtained by dividing the image data for composition, and the regions 3 and 4 are sequentially and cyclically used and associated with the band corresponding to the sub-pattern 2 among the bands obtained by dividing the image data for composition.

Figure 16:
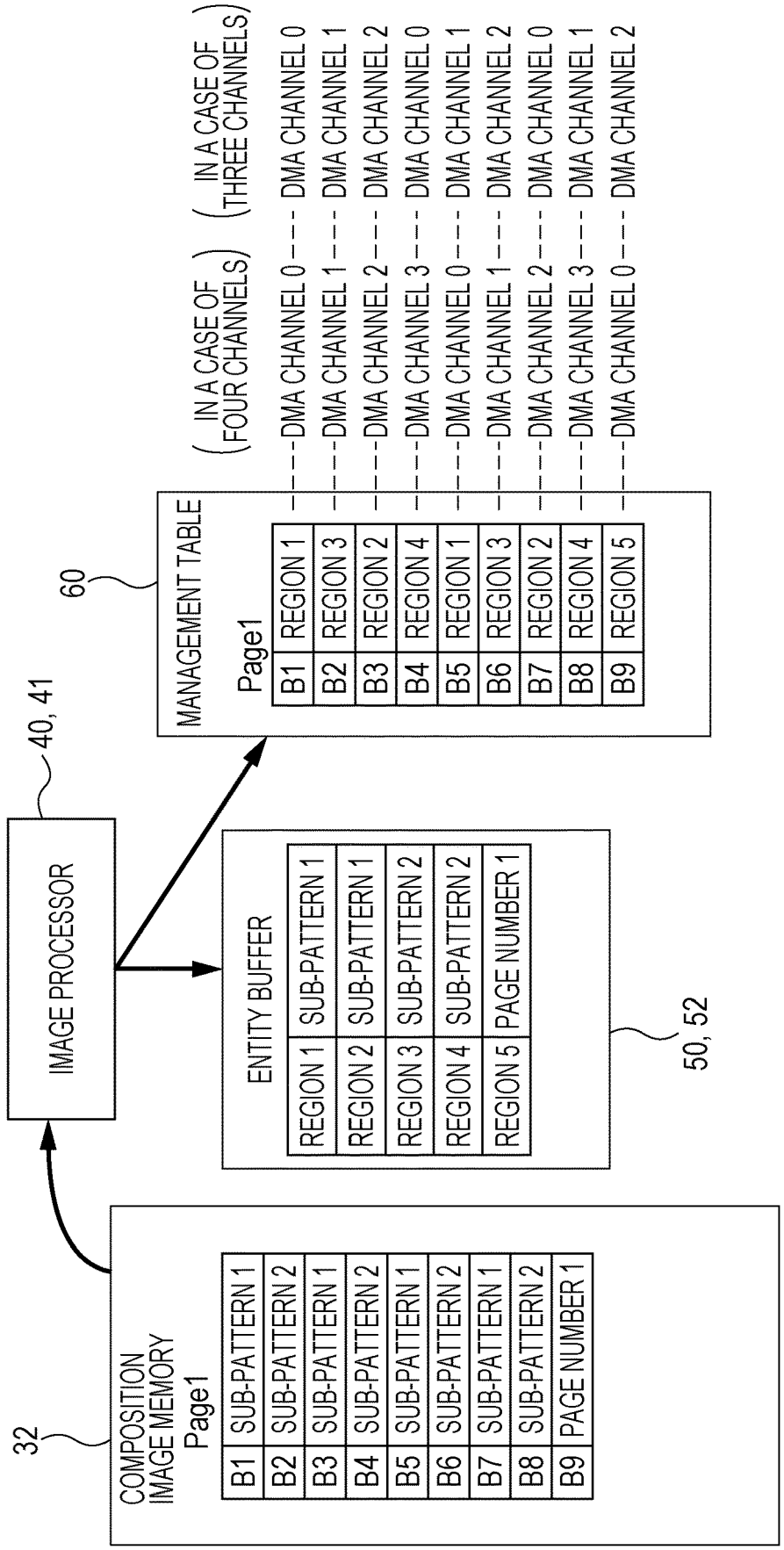
FIG. 16 is a diagram of an example of a state of an entity buffer and a created management table according to a sixth embodiment.

In FIG. 16, a state of the entity buffer 52 at this time and a created management table 60 are illustrated. In this example, since the bands B1, B3, B5, and B7 in the bands which are obtained by dividing the image data for composition have the sub-pattern 1, the regions 1 and 2 are cyclically (alternately) allocated to these bands. The region 1 is allocated to the band B1, the region 2 is allocated to the band B3, the region 1 is allocated to the band B5, and the region 2 is allocated to the band B7. Since the bands B2, B4, B6, and B8 have the sub-pattern 2, the regions 3 and 4 are cyclically (alternately) allocated to these bands. The region 3 is allocated to the band B2, the region 4 is allocated to the band B4, the region 3 is allocated to the band B6, and the region 4 is allocated to the band B8.

The reader 42 cyclically allocates the plurality of DMA channels to each band in reading order and to read each band. To the management table 60 in FIG. 16, the DMA channels which are used when each band is read from the entity buffer 52 are added. The DMA channels which are used when the number of DMA channels is three are added.

In this way, by securing the plurality of regions in the entity buffer 52 relative to the same sub-pattern so as to satisfy $Q \times M \geq N$, concurrent access of the plurality of DMA channels to the same region can be prevented.

Seventh Embodiment

In a seventh embodiment, in a case where a background part of an image expressed by image data for composition is made by repetition of predetermined image patterns, the image data for composition is divided into bands as dividing a single image pattern into sub-patterns as many as DMA channels.

Figure 17:
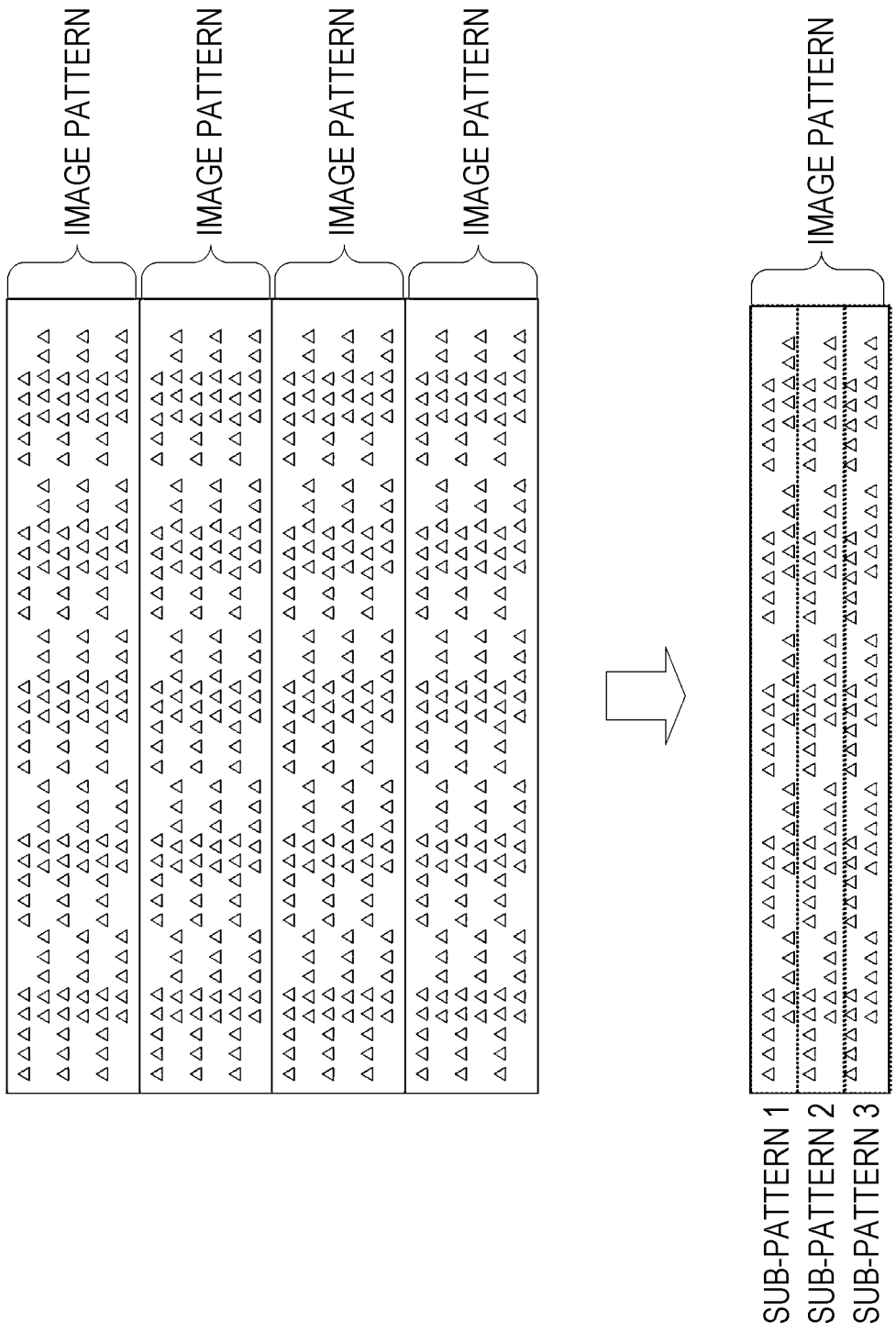
FIG. 17 is a diagram of an example in which a single image pattern is divided into three sub-patterns in a case where there are three DMA channels.
Figure 18:
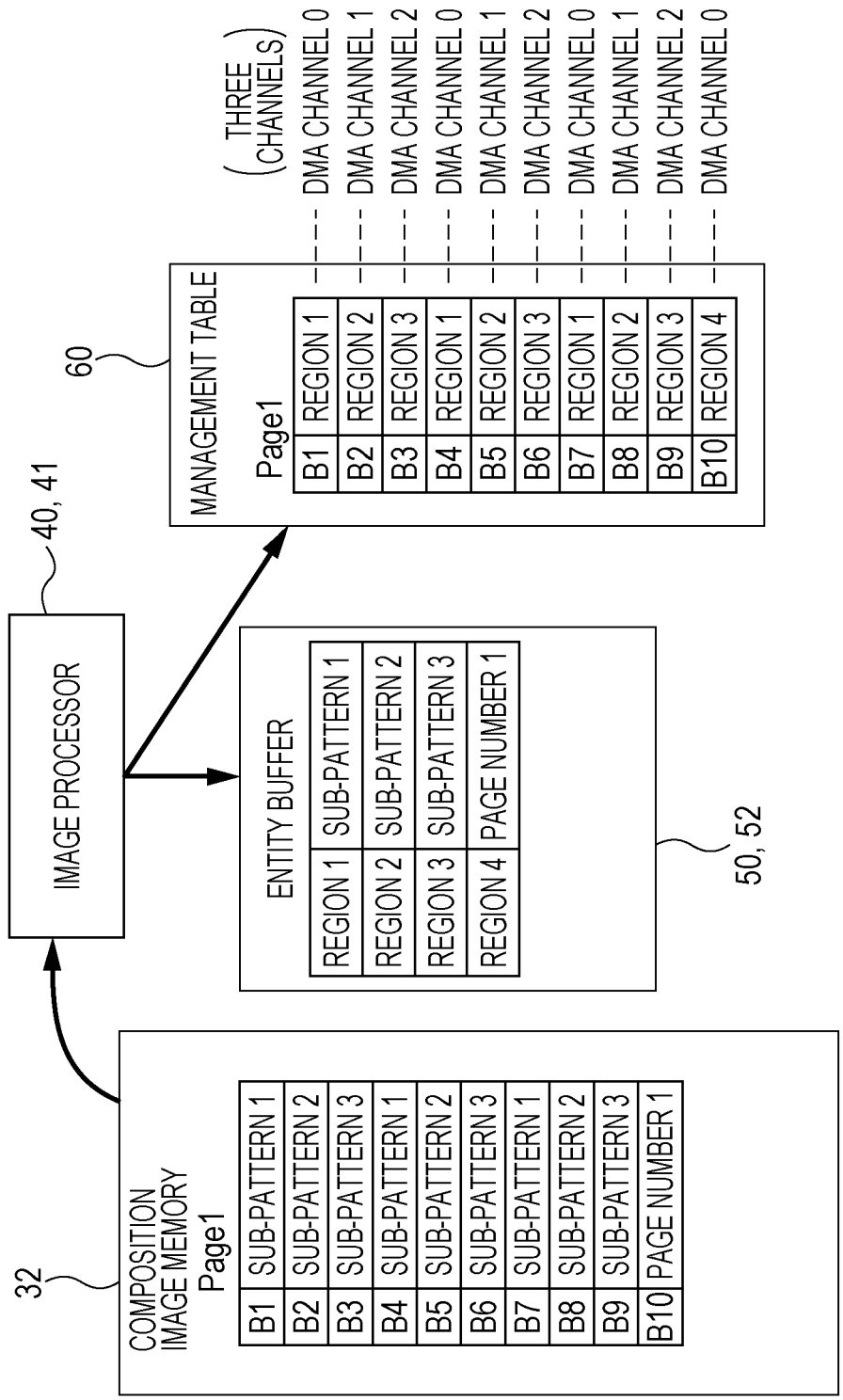
FIG. 18 is a diagram of an example of a state of an entity buffer and a created management table according to a seventh embodiment.
Figure 19:
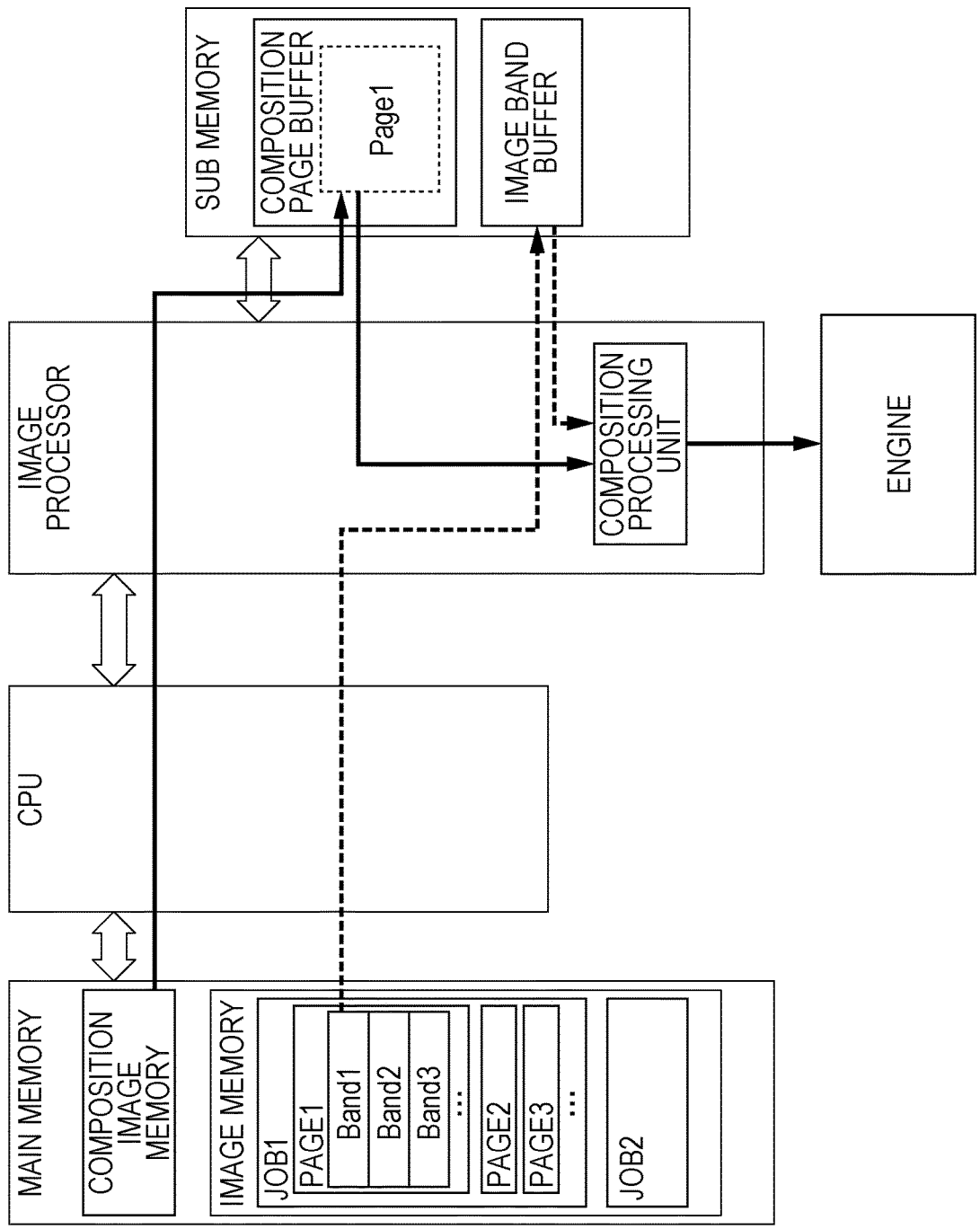
FIG. 19 is a diagram of an example of an outline of a flow of image data in a conventional image forming apparatus.
Figure 20:
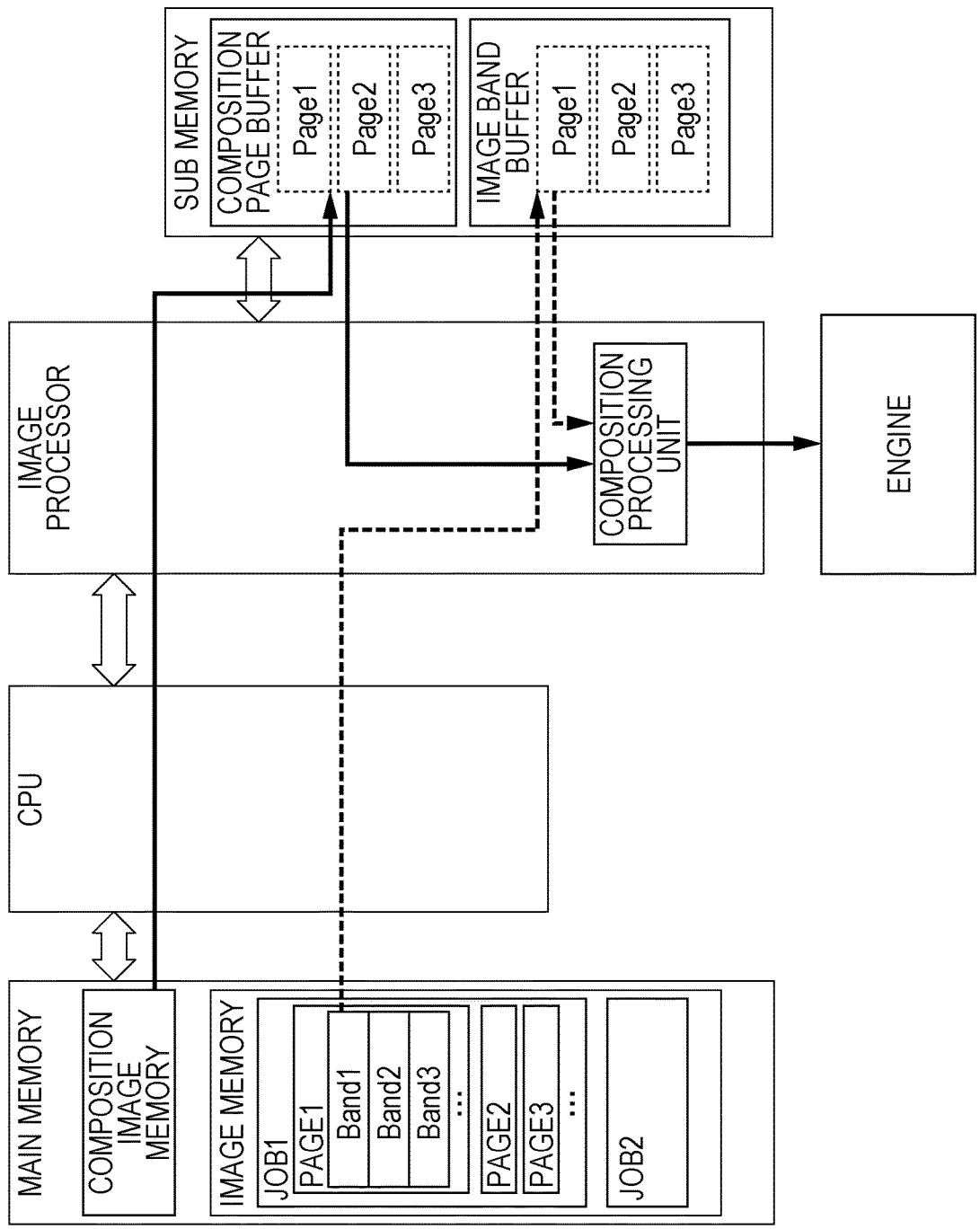
FIG. 20 is a diagram of an exemplary configuration of an image forming apparatus capable of storing a page buffer for composition and an image band buffer in a sub memory, respectively for a plurality of pages necessary for continuous printing.

In the example in FIG. 17, in a case of three DMA channels, a single image pattern is divided into three sub-patterns. Then, the image data for composition is divided into bands in sub-pattern units. In FIG. 18, a management table 60 generated by a storage 41 in this case and a state of an entity buffer 52 are illustrated. To the management table 60 in FIG. 18, the DMA channels which are used when each band is read from the entity buffer 52 are added.

Eighth Embodiment

In an eighth embodiment, image data for composition in the fifth to seventh embodiments are further magnified. That is, in a case where the band size when the divider 22 divides the band and the band size when the composition processing unit 43 performs composition processing are fixed to a predetermined size or the band sizes which can be selected are limited, the image data for composition is magnified so that the size of the sub-pattern coincides with the band size which can be realized at the time of the division or the composition.

As described above, according to the embodiments of the present invention, it is possible to reduce the capacity of the entity buffer 52 to be secured in the sub memory 50 and (virtually) store the image data for composition of a number of pages in the sub memory 50. Furthermore, since a method of sequentially reading image data for composition for one page from an output memory to compose the image can be employed, it is not necessary to provide special hardware capable of composing an image at a specified position in one page. Therefore, a large number of pages can be stored with less capacity of the sub memory 50 without complicating the hardware. Therefore, it is possible to prevent deterioration in print speed while coping with composition of an image such as a page number and to ensure high productivity without increasing the capacity of the sub memory 50.

For example, to ensure high productivity, it is desirable to start printing after the image data of 20 pages and the image data for composition be stored in the sub memory 50. However, according to the present invention, since the image data for composition can be virtually stored with less memory capacity, a large number of pages can be stored while suppressing the memory capacity.

Embodiments of the present invention have been described above with reference to the drawings. However, the specific structure is not limited to the structure indicated in the embodiments, and the present invention includes an addition and change in a range which does not depart from the scope of the present invention.

The configuration of the image forming apparatus 3 is not limited to that in the embodiments illustrated in FIG. 2 and the like. For example, the image data to be printed may be directly read from the image memory 31 and transmitted to the composition processing unit 43.

The address of the region to be stored in the management table 60 does not have to be an actual memory address. For example, the address may be an identification number which has been previously applied for each region.

Although embodiments of the present invention have been described and illustrated in detail, the disclosed embodiments are made for purposes of illustration and example only and not limitation. The scope of the present invention should be interpreted by terms of the appended claims

What is claimed is:

1. An image forming apparatus comprising:
   a hardware processor that:
   generates image data for composition in page units which is composed with image data to be printed; and
   divides the image data for composition into a plurality of bands;
   an output memory;
   a storage that determines whether image data of each band divided by the hardware processor is the same as image data of another band, secures a unique region for the band of which the image data is not the same as that of any other bands in the output memory, transfers the image data of the band to the unique region and associates the band with the unique region, secures common regions less than the number of plurality of bands for the plurality of bands having the same image data in the output memory, transfers the image data of one of the plurality of bands to the common region and associates any one of the common regions to each of the plurality of bands;
   a reader that reads the image data from the region associated with each band and outputs the image data for composition in page units before the division;
   a composer that composes the image data for composition output from the reader with the image data to be printed; and
   an image former that forms an image based on the composed image data output from the composer.

2. The image forming apparatus according to claim 1, wherein
   the storage secures the single common region relative to the plurality of bands having the same image data and associates all of the plurality of bands to the single common region.

3. The image forming apparatus according to claim 1, wherein
   the reader has N (N is an integer of two or more) direct memory access (DMA) channels capable of being operated in parallel and used for reading,
   the storage secures N common regions in the output memory for the plurality of bands having the same image data, sequentially and cyclically allocates the N common regions, and associate any one of the common regions with each of the plurality of bands, and
   the reader sequentially and cyclically allocates the N direct memory access (DMA) channels to each band and performs reading.

4. The image forming apparatus according to claim 1, wherein
   in a case where a background part of an image expressed by the image data for composition is made by a repetition of the same image patterns, the hardware processor divides the image data for composition into bands having a size corresponding to the image pattern.

5. The image forming apparatus according to claim 1, further comprising:
   a magnification part that magnifies the image data for composition so that the image pattern has the size corresponding to a predetermined band size in a case where the background part of the image expressed by the image data for composition is made by the repetition of the same image patterns and the band size is not optionally changed.

6. The image forming apparatus according to claim 1, wherein
   the hardware processor divides the image data for composition into bands for each sub-pattern as dividing the image pattern into the plurality of sub-patterns in a case where a background part of an image expressed by the image data for composition is made by a repetition of the same image patterns, and
   the storage secures the common region corresponding to the sub-pattern for each sub-pattern included in a single image pattern, stores image data of the sub-pattern corresponding to a common region in each common region, and associates each band obtained by dividing the image data for composition with the common region where the image data of the band is stored.

7. The image forming apparatus according to claim 6, wherein
   the reader has a plurality of direct memory access (DMA) channels capable of being operated in parallel and used for the reading, and
   the reader cyclically allocates the plurality of direct memory access (DMA) channels to each band in reading order and performs the reading.

8. The image forming apparatus according to claim 7, wherein
   the hardware processor divides the image data for composition into bands as dividing the image pattern into sub-patterns as many as the DMA channels in a case where a background part of an image expressed by the image data for composition is made by a repetition of predetermined image patterns.

9. The image forming apparatus according to claim 7, wherein
   in a case where the hardware processor divides the image data for composition into bands by dividing the image pattern into a plurality of sub-patterns whose number is less than that of the DMA channels, the storage secures M (M is minimum value at which the number of sub-patterns included in single image pattern×M is equal to or more than the number of DMA channels) common region corresponding to the respective sub-patterns included in the single image pattern, stores the image data of the sub-pattern corresponding to the common region in each common region, sequentially and cyclically allocates the M common regions corresponding to the sub-patterns to the respective sub-patterns, and associates each band obtained by dividing the image data for composition with a common region where image data of the band is stored.

10. The image forming apparatus according to claim 6, further comprising:
    a magnification part that magnifies the image data for composition so that the sub-pattern has the size corresponding to a predetermined band size in a case where the background part of the image expressed by the image data for composition is made by the repetition of the same image patterns and the band size is not optionally changed.

11. An image forming method comprising:
    generating image data for composition in page units which is composed with image data to be printed;

dividing the image data for composition into a plurality of bands;

determining whether image data of each band divided by the dividing is the same as image data of another band, securing a unique region for the band of which the image data is not the same as that of any other bands in an output memory, transferring the image data of the band to the unique region and associating the band with the unique region, securing common regions less than the number of plurality of bands for the plurality of bands having the same image data in the output memory, transferring the image data of one of the plurality of bands to the common region and associating any one of the common regions to each of the plurality of bands;

reading the image data from the region associated with each band and outputting the image data for composition in page units before the division;

composing the image data for composition output by the reading with the image data to be printed; and forming an image based on the composed image data output from the composing.

12. The image forming method according to claim 11, wherein
the associating includes securing the single common region relative to the plurality of bands having the same image data and associating all of the plurality of bands to the single common region.

13. The image forming method according to claim 11, wherein
the associating includes securing N common region for the plurality of bands having the same image data in the output memory and sequentially and cyclically allocating the N common region in order to associate any one of the common regions to each of the plurality of bands, and
the reading includes sequentially and cyclically allocating N (N is an integer of two or more) direct memory access (DMA) channel capable of being operated in parallel and which is used for the reading to each band and performing the reading.

14. The image forming method according to claim 11, wherein
in a case where a background part of an image expressed by the image data for composition is made by a repetition of the same image patterns, the dividing includes dividing the image data for composition into bands having a size corresponding to the image pattern.

15. The image forming method according to claim 11, further comprising:
magnifying the image data for composition so that the image pattern has the size corresponding to a predetermined band size in a case where the background part of the image expressed by the image data for composition is made by the repetition of the same image patterns and the band size is not optionally changed.

16. The image forming method according to claim 11, wherein
the dividing includes dividing the image data for composition into bands for each sub-pattern as dividing the image pattern into the plurality of sub-patterns in a case where a background part of an image expressed by the image data for composition is made by a repetition of the same image patterns, and
the associating includes securing the common region corresponding to the sub-pattern for each sub-pattern included in a single image pattern, storing image data of the sub-pattern corresponding to a common region in each common region, and associating each band obtained by dividing the image data for composition with the common region where the image data of the band is stored.

17. The image forming method according to claim 16, wherein
the reading includes cyclically allocating a plurality of direct memory access (DMA) channels, capable of being operated in parallel, which is used for the reading to each band in reading order and performing the reading.

18. The image forming method according to claim 17, wherein
the dividing includes dividing the image data for composition into bands as dividing the image pattern into sub-patterns as many as the DMA channels in a case where the background part of the image expressed by the image data for composition is made by a repetition of predetermined image patterns.

19. The image forming method according to claim 17, wherein
in a case where the image data for composition is divided into bands by dividing the image pattern into a plurality of sub-patterns whose number is less than that of the DMA channels in the dividing, the associating includes securing M (M is minimum value at which the number of sub-patterns included in single image pattern×M is equal to or more than the number of DMA channels) common region corresponding to the respective sub-patterns included in the single image pattern, storing the image data of the sub-pattern corresponding to the common region in each common region, sequentially and cyclically allocating the M common regions corresponding to the sub-patterns to the respective sub-patterns, and associating each band obtained by dividing the image data for composition with a common region where image data of the band is stored.

20. The image forming method according to claim 16, further comprising:
magnifying the image data for composition so that the sub-pattern has the size corresponding to a predetermined band size in a case where the background part of the image expressed by the image data for composition is made by the repetition of the same image patterns and in a case where the band size is not optionally changed.

* * * * *